(12) United States Patent
Garthwaite

(10) Patent No.: US 7,062,519 B2
(45) Date of Patent: Jun. 13, 2006

(54) INCREMENTAL SCANNING OF ENORMOUS OBJECTS TO IMPROVE SCHEDULING AND PAUSE-TIME BEHAVIOR OF GARBAGE COLLECTION

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 430 days.

(21) Appl. No.: 10/375,285

(22) Filed: Feb. 27, 2003

(65) Prior Publication Data

US 2004/0199556 A1 Oct. 7, 2004

(51) Int. Cl.
*G06F 17/30* (2006.01)
(52) U.S. Cl. .................................... 707/206
(58) Field of Classification Search ............... 707/206, 707/205, 1; 711/159, 170, 173; 718/102, 718/107
See application file for complete search history.

(56) References Cited

U.S. PATENT DOCUMENTS

| 4,724,521 A | 2/1988 | Carron et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilsen et al. |
| 5,687,370 A | 11/1997 | Garst et al. |
| 5,801,943 A | 9/1998 | Nasburg |
| 5,845,276 A | 12/1998 | Emerson et al. |
| 5,845,298 A | 12/1998 | O'Connor et al. |
| 5,857,210 A | 1/1999 | Tremblay et al. |
| 5,873,104 A | 2/1999 | Tremblay et al. |
| 5,873,105 A | 2/1999 | Tremblay et al. |
| 5,900,001 A | 5/1999 | Wolczko et al. |
| 5,903,900 A | 5/1999 | Knippel et al. |
| 5,930,807 A | 7/1999 | Ebrahim et al. |
| 5,953,736 A | 9/1999 | O'Connor et al. |
| 5,960,087 A | 9/1999 | Tribble et al. |
| 5,999,974 A | 12/1999 | Ratcliff et al. |
| 6,021,415 A | 2/2000 | Cannon et al. |
| 6,047,125 A | 4/2000 | Agesen et al. |
| 6,049,390 A | 4/2000 | Notredame et al. |
| 6,049,810 A | 4/2000 | Schwartz et al. |

(Continued)

FOREIGN PATENT DOCUMENTS

EP 0 904 055 A1 9/1999

(Continued)

OTHER PUBLICATIONS

David Bacon et al., A unified theory of garbage collection, (2004) ACM Press, NY, NY, pp. 50-68.*

(Continued)

*Primary Examiner*—Diane Mizrahi
(74) *Attorney, Agent, or Firm*—Kudirka & Jobse, LLP

(57) ABSTRACT

A technique for incrementally collecting enormous objects including scanning portions of the enormous objects on different collection steps. The scanning can be accomplished with a number of collection sets where the enormous object is re-linked and older cars remembered sets are updated on subsequent collection steps. Unscanned portions of the enormous object are scanned on subsequent collection cycles until the enormous object has been fully scanned. This incremental collection can be performed concurrently with collections of other generations and applications.

24 Claims, 26 Drawing Sheets

U.S. PATENT DOCUMENTS

| | | | |
|---|---|---|---|
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1 | 2/2001 | Garthwaite |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B1 | 3/2002 | Sauntry et al. |
| 6,381,738 | B1 | 4/2002 | Choi et al. |
| 6,393,439 | B1 | 5/2002 | Houldsworth et al. |
| 6,415,302 | B1 | 7/2002 | Garthwaite et al. |
| 6,424,977 | B1 | 7/2002 | Garthwaite |
| 6,434,576 | B1 | 8/2002 | Garthwaite |
| 6,434,577 | B1 | 8/2002 | Garthwaite |
| 6,442,661 | B1 | 8/2002 | Dreszer |
| 6,449,626 | B1 | 9/2002 | Garthwaite et al. |
| 6,496,871 | B1 | 12/2002 | Jagannathan et al. |
| 6,529,919 | B1 | 3/2003 | Agesen et al. |
| 6,567,905 | B1 | 5/2003 | Otis |
| 6,640,278 | B1 | 10/2003 | Nolan et al. |
| 6,757,890 | B1 | 6/2004 | Wallman |
| 6,769,004 | B1 | 7/2004 | Barrett |
| 6,820,101 | B1 | 11/2004 | Wallman |
| 6,826,583 | B1 | 11/2004 | Flood et al. |
| 6,868,488 | B1 | 3/2005 | Garthwaite |
| 6,892,212 | B1 | 5/2005 | Shuf et al. |
| 6,928,450 | B1 | 8/2005 | Nagarajan et al. |
| 6,931,423 | B1 | 8/2005 | Sexton et al. |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 | 9/2002 | Shuf et al. |
| 2003/0088658 | A1 | 5/2003 | Davies et al. |
| 2003/0200392 | A1 | 10/2003 | Wright et al. |
| 2003/0217027 | A1 | 11/2003 | Farber et al. |
| 2004/0010586 | A1 | 1/2004 | Burton et al. |
| 2004/0039759 | A1 | 2/2004 | Detlefs et al. |
| 2004/0098553 | A1* | 5/2004 | Garthwaite ............... 711/170 |
| 2004/0103126 | A1* | 5/2004 | Garthwaite ............... 707/206 |
| 2004/0111444 | A1* | 6/2004 | Garthwaite ............... 707/205 |
| 2004/0111445 | A1* | 6/2004 | Garthwaite et al. ....... 707/206 |
| 2004/0111446 | A1* | 6/2004 | Garthwaite ............... 707/206 |
| 2004/0111447 | A1* | 6/2004 | Garthwaite ............... 707/206 |
| 2004/0215914 | A1 | 10/2004 | Dussud |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

Alain Azagury et al., Combining card marking with remembered sets: how to save scanning time, (1998), ACM Press, NY. NY., pp. 10-19.*

Jones and Lins, "Garbage Collection: Algorithms for Automatic Dynamic Memory Management",1996, pp. 165-179, Wiley, New York.

Paul Wilson, "Uniprocessor Garbage Collection Techniques", 1994, pp. 1067, Technical Report, University of Texas.

Hudson and Moss, "Incremental Collection of Mature Objects", Proceedings of International Workshop on Memory Management, 1992, Springer-Verlag.

Seligmann and Grarup, "Incremental Mature Garbage Collection Using the Train Algorithm", Aarhus University, Computer Science Department.

Grarup and Seligmann, "Incremental mature Garbage Collection, M.Sc. Thesis", Aarhus University, Computer Science Department, 1993.

U.S. Appl. No. 10/287,851, filed Nov. 5, 2002, Garthwaite, et al.

Appel, "Simple Generational Garbage Collection and Fast Allocation", Software Practice and Experience, 19(2), 1989, 171-183.

Appel, et al., "Real-Time Concurrent Collection on Stock Multiprocessors", ACM SIGPLAN Notices, 1988.

Appleby, Karen, "Garbage Collection for Prolog Based on WAM, vol. 31, Issue 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Bacon et al., "Jave without the Coffee Breaks: A nonintrusive Multiprocessor Garbage Collector", SIGPLAN Conference on Programming Language Design and Implementation, Jun. 2001, Snowbird, UT.

Baker, "List Processing in Real Time on a Serial Computer", Communications of the ACM 21, Apr. 1978, 280-294.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, "An Efficient List-Moving Algorithm Using Constant Workspace, vol. 19 No. 6", Communications of the ACM, Jun. 1976, 352-354.

Clark et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking et al., "Remembered Sets Can Also Play Cards", OOPSLA/ECOOP Workshop on Garbage Collection in Object-Oriented Systems, Oct. 1993.

Hosking et al., "Protection Traps and Alternatives for Memory Management of an Object-Oriented Language", Object Systems Laboratory, Dec. 1993, 1-14, Dept. of Comp. Sci., Amerherst, MA.

Hudson et al., "Adaptive Garbage Collection for Modula-3 and Small Talk", OOPSLA.ECOOP '90 Workshop on Garbage Collection in Obect-Oriented Systems, Oct. 27, 1990.

Hudson et al., "A Language-Independent Garbage Collector Toolkit", Coins Technical Report, Sep. 1991.

Hudson et al., "Training Distributed Garbage: The DMOS Collector", University of St. Andrews Tech Report, 1997, 1-26.

Hudson et al., "Garbage Collecting the World: One Car at a Time", ACM SIGPLAN Notices 32, 1997, 162-175.

Hudson et al., "Sapphire: Copying GC Without Stopping the World", Practice and Experience Special Issue, Data Unknown, JAVA/Grande/Iscope.

Lieberman et al., "A Real-Time Garbage Collector Based on the Lifetimes of Objects", Communications of the ACM, 1983, 26(6).

Liskov et al., "Partitioned Garbage Collection of a Large Stable Heap", Proceedings of IWOOOS, 1996, 117-121.

Moon, "Garbage Collection in a Large Lisp Systems", Conference Record of the 1984 ACM Symposium on LISP and Functional Programming, Aug. 1984, 235-246, Austin, TX.

Moss et al., "A Complete and Coarse-Grained Incremental Garbage Collection for Persisten Object Stores", Proceedings 7th Intl'l Workshop on Persisten Object System, 1996, 1-13, Cape May, NJ.

Munro et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Development Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Roy et al., "Garbage Collection in Object-Oriented Databases Using Transactional Cyclic Reference Counting", VLDB Journal-The International Journal on Very Large Da Bases, vol. 7, Issue 3, 1998, 179-193.

Shuf et al., "Exploiting Profilic Types for Memory Management and Optimizations. ACM ISBN Sep. 2, 2001", POPL, Jan. 2002, Portland.

Sobalvarro, "A Lifetime-based Garbage Collector for LISP Systems on General-Purpose Computers", Department of Electrical Engineering and Computer Science at MIT, Sep. 1988, AITR-1417.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, 1984, 19(5).

Ungar et al., "Tenuring Policies for Generation-Based Storage Reclamation", ACMSIGPLAN Notices, 1988, 23(11)1-17.

Venners, "Garbage Collection, Inside the Java 2 Virtual Machine: Chapter 9", www.artima.com, Date Unknown, parts 1-18.

Wilson, "Uniprocessor Garbage Collection Techniques", Proceedings of Int'l Workshop on Memory Management, 1992, vol. 637.

Withington, P.T., "How Real is "Real-Time" GC?", Symbolics, Inc., Oct. 6, 1991, Burlington, MA.

Zee et al., "Write Barrier Removal by Static Analysis", OOPSLA '02, Nov. 2002.

Zorn, "Segregating Heap Objects by Reference Behavior and Lifetime", In 8th Int'l Conferenceon Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury et al., "Combining Card Marking With Remembered Sets: How to Save Scanning Time", ACM SIGPLAN Notices, Oct. 1998, vol. 34(3), ACM Press, Vancouver, Canada.

Cheney, "A Nonrecursive List Compacting Algorithm, vol. 13, Number 11", Communications of the ACM, Nov. 1970, 677-678, Uni. Math. Lab., Cambridge, European Patent Office.

Cheng et al., "Generational Stack Collection and Profile-Driven Pretenuring", SIGPLAN'98 Conference on Programming Languages Design and Implementation, Jun. 1998, 162-173, ACM PRESS, Montreal, Canada.

Lam et al., "Object Type Directed Garbage Collection to Improve Locality", Proceedings of the International Workshop on Memory Management, Sep. 1992, 404-425, St. Malo, France.

Lam et al., "Effective Static-Graph Reorganization to Improve Locality in Garbage Collected Systems", Proceedings of ACM SIGPLAN Conference on Programming Language Design and Implementation, Jun. 1991, Toronto, Canada.

Pirinen, Pekka, "Barrier Techniques for Incremental Tracing", Harlequin Limited, Date Unknown, 20-25, Cambridge, Great Britain.

Wilson et al., "Effective Static-Graph Reorganization to Improve Locality in Garbage Collected Systems", Proceedings of ACM SIGPLAN Conference on Programming Language Design and Implementation, Jun. 1991, Canada.

* cited by examiner

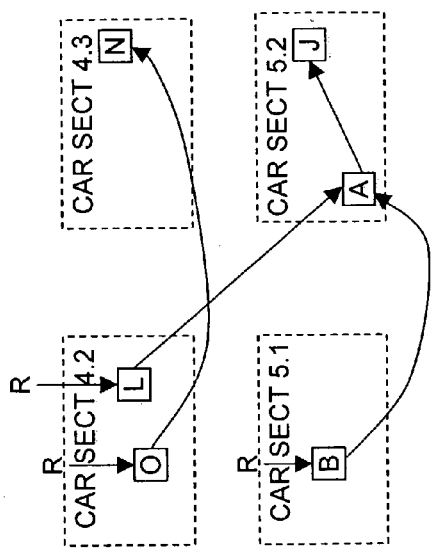
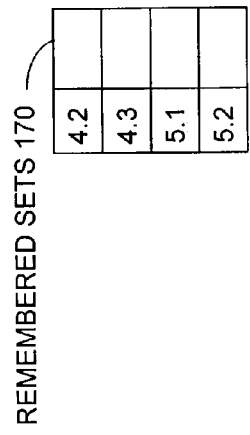
FIG. 12I
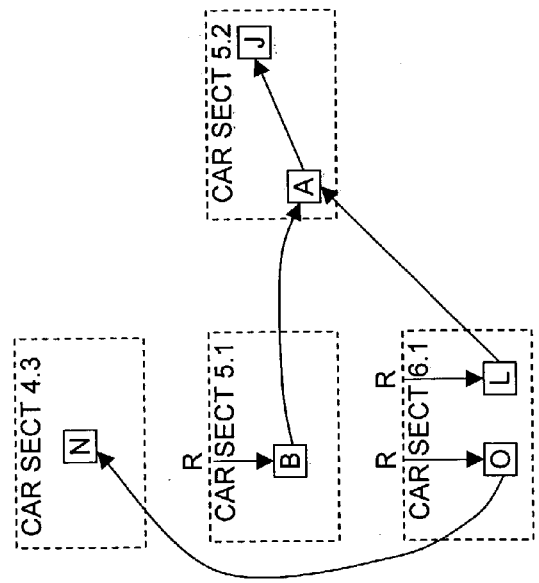
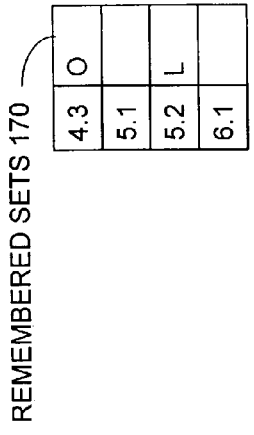
FIG. 12J

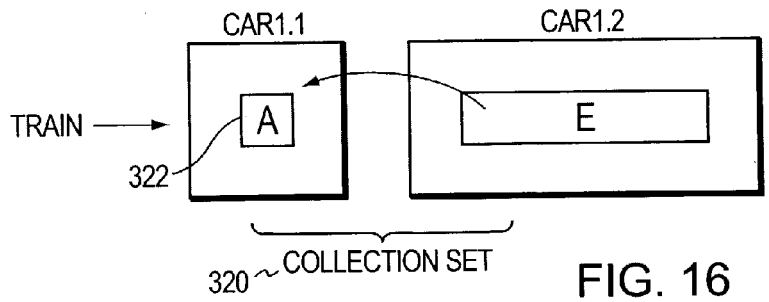
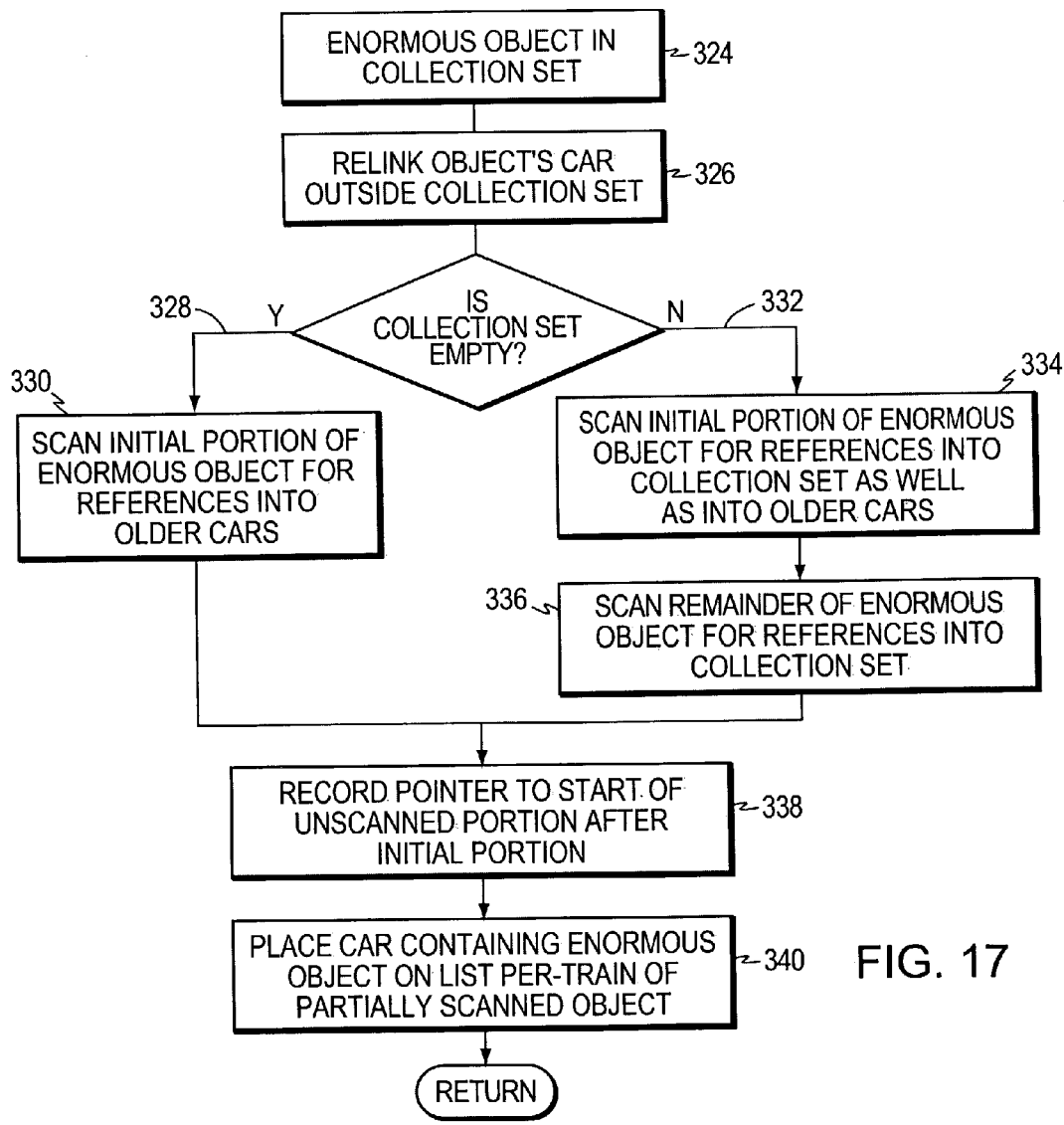

INCREMENTAL SCANNING OF ENORMOUS OBJECTS TO IMPROVE SCHEDULING AND PAUSE-TIME BEHAVIOR OF GARBAGE COLLECTION

BACKGROUND OF THE INVENTION

1. Field of the Invention

The present invention is directed to memory management. It particularly concerns what has come to be known as "garbage collection.

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to of instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as, will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that is term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into, the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed, when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed; in one of the selected train's existing cars; but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5. 1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

A continuing problem for incremental copying garbage collectors is that, if an object is enormous, much larger than a normal car or even many normal sized cars, and that enormous object is collected at one time, any time bounds or constraints on the interruption of an application may be exceeded.

Such enormous objects are re-linked rather than copied, since re-linking takes less time than copying and then updating all the references. Re-linked only requires updating the remembered sets of older cars in the generation referenced by the re-linked object. However, enormous objects may reference many objects and updating the remembered sets of many older cars still could interrupt an application for an unacceptably long time.

Known prior art regarding the Train algorithm have not addressed this issue. For reference, papers by Hudson and Moss and by Grarup and Seligmann, such papers well known in this field, provide useful general information on the train algorithm.

There is a need to efficiently collect enormous objects while maintaining interruption time constraints on concurrent applications.

SUMMARY OF THE INVENTION

The present invention provides apparatus and process solutions to collecting these enormous objects by breaking up and collecting only portions of the enormous objects, and thus breaking up the work into smaller more time-acceptable increments. The portions are scanned and references inserted into corresponding remembered sets over a series of collection intervals.

In order to maintain control while collecting such enormous objects the present invention provides for re-linking the enormous object rather than relocating. The re-linked enormous object is partially scanned for references into older cars and corresponding insertions are made into these older cars' remembered sets. The location of the unscanned portion of the enormous object is saved for subsequent collection intervals until the entire enormous object has been scanned and proper insertions into the remembered sets of older cars made.

If there are other normal cars with normal objects in the collection set those objects are evacuated as described above, and remembered sets of older cars properly up-dated. The re-linked enormous object is scanned for references into the collection set and the references in the enormous object are updated with the new locations of any evacuated objects.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

FIG. 16 is a block diagram of a two car collection set including one enormous object in one car; and FIGS. 17 and 18 are flow charts illustrating an embodiment of the present invention.

DETAILED DESCRIPTION OF AN ILLUSTRATIVE EMBODIMENT

Figure 13A:
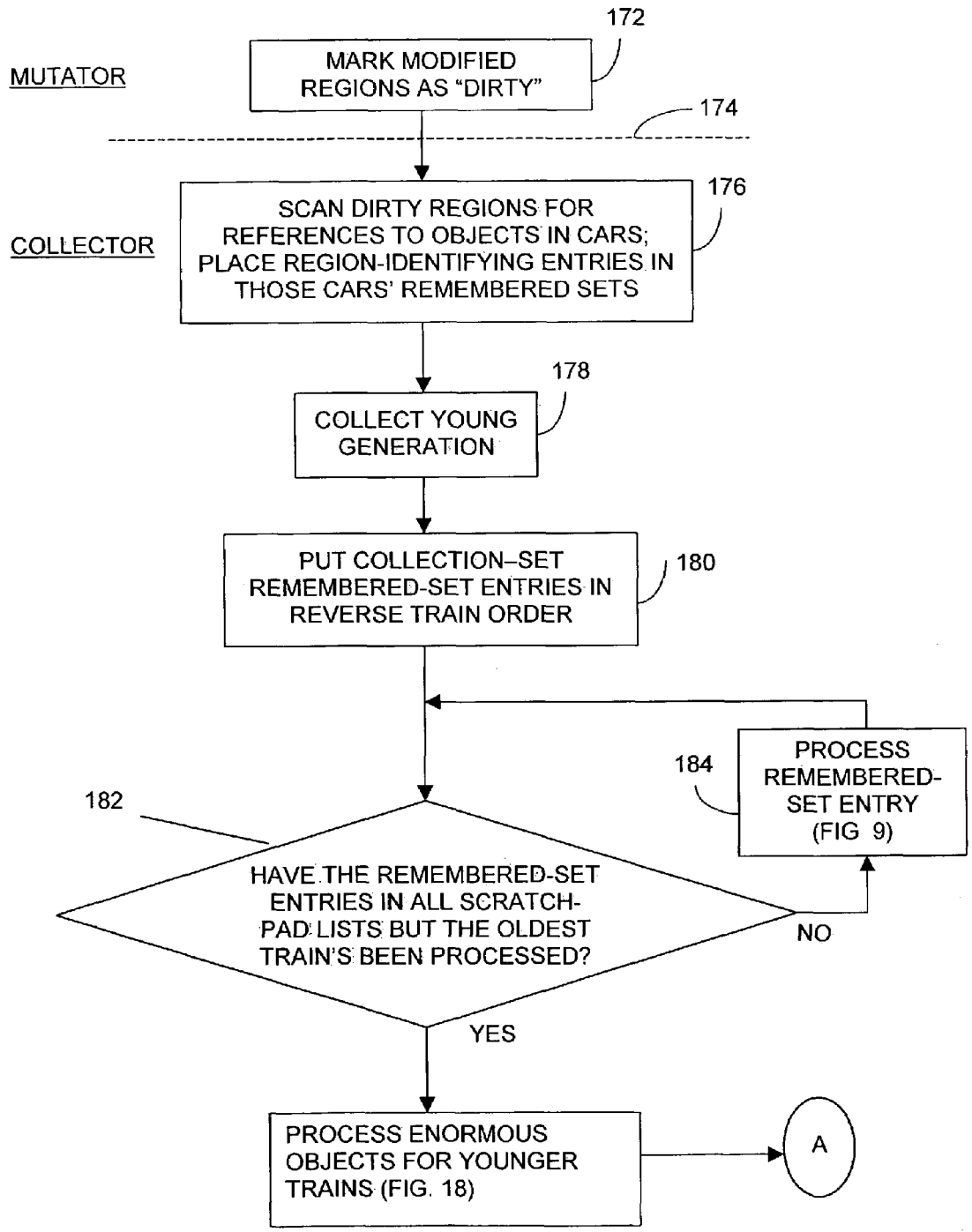
FIGS. 13A and 13B together constitute a flow chart that illustrates a collection interval, as FIGS. 8A and 8B do, but illustrates optimizations that FIGS. 8A and 8B do not include.
Figure 13B:
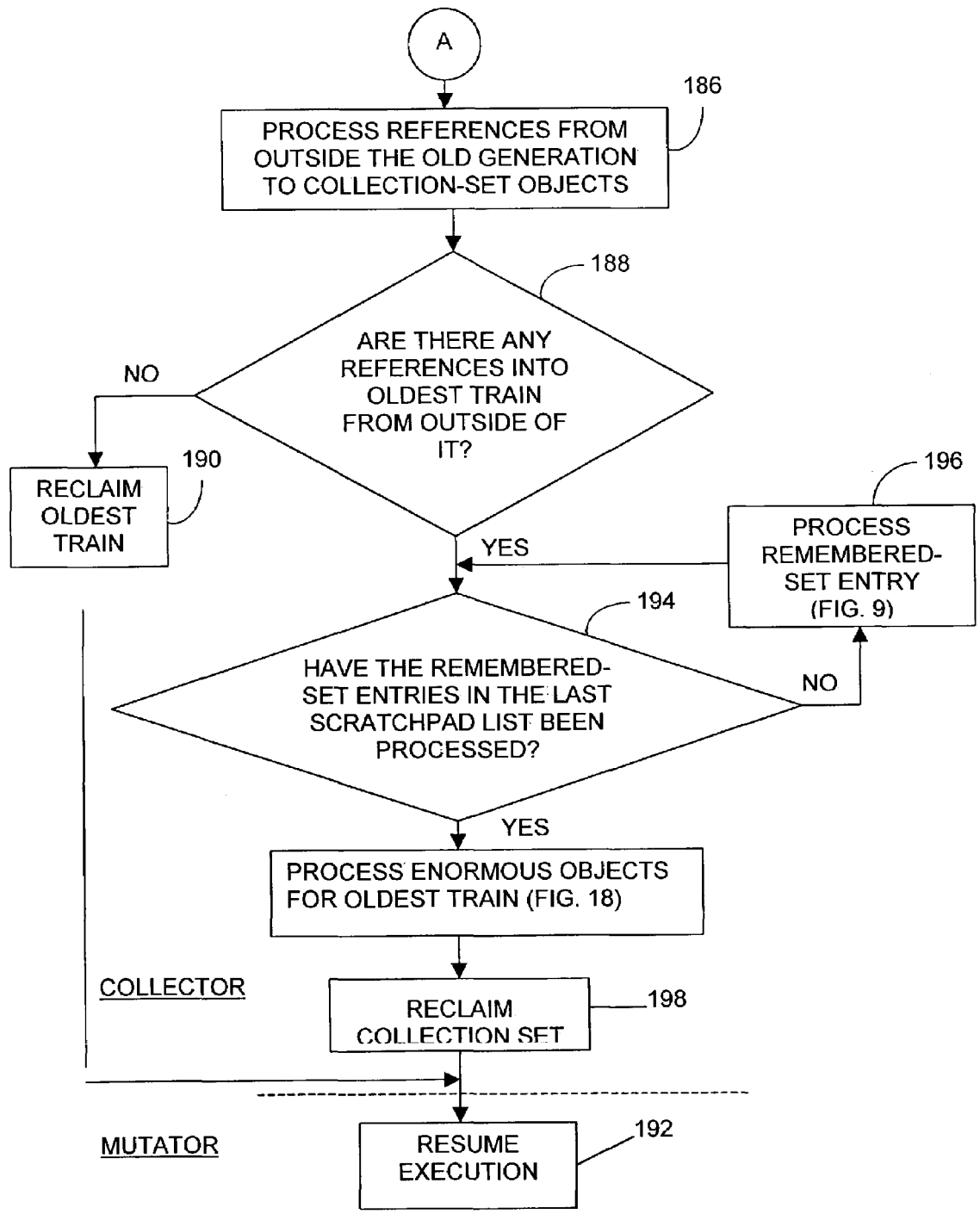

The illustrated embodiment employs a way of implementing the train algorithm that is in general terms similar to the way described above. But, whereas it was tacitly assumed above that, as is conventional, only a single car section would be collected in any given collection interval, the embodiment now to be discussed may collect more than a single car during a collection interval. FIGS. 13A and 13B (together, "FIG. 13") therefore depict a collection operation that is similar to the one that FIG. 8 depicts, but FIG. 13 reflects cars containing enormous objects and multiple-car collection sets and depicts certain optimizations that some of the invention's embodiments may employ.

Figure 1:
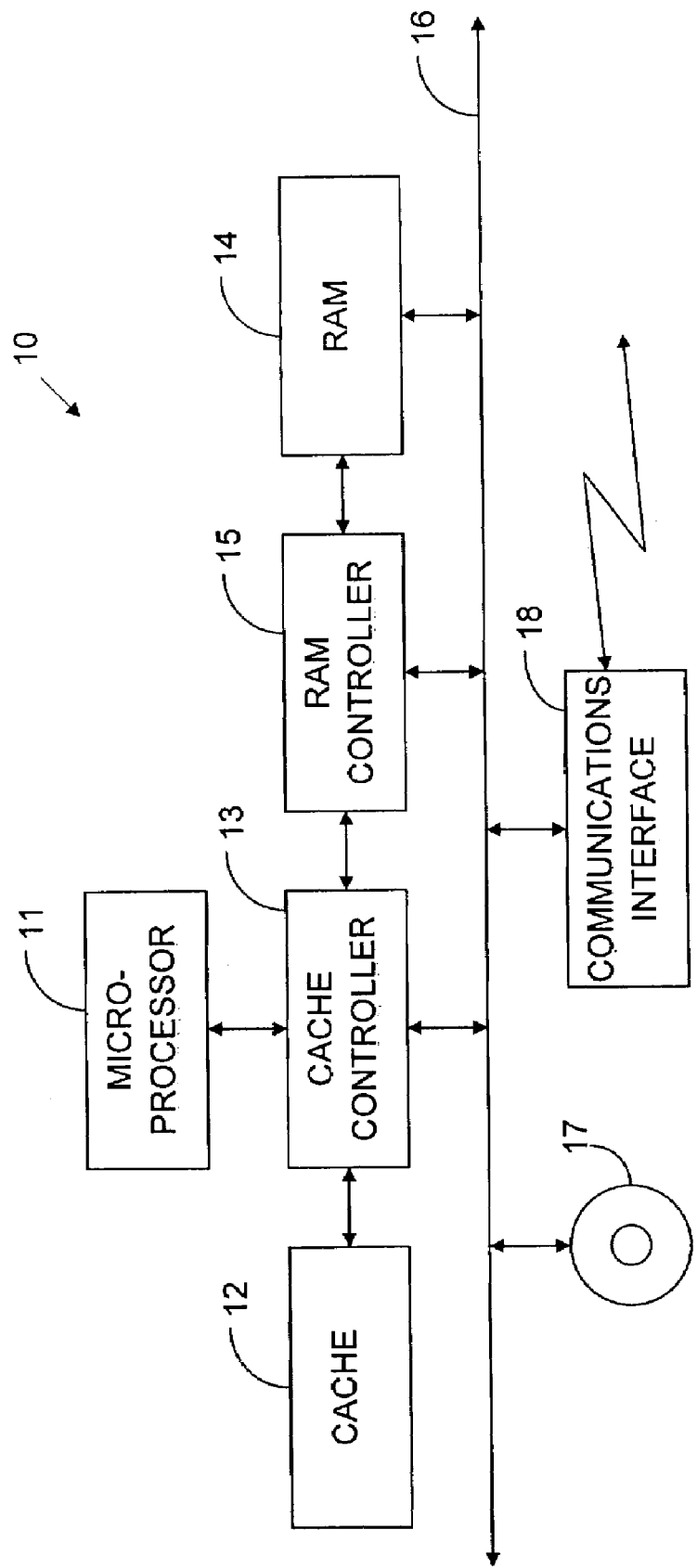
FIG. 1, discussed above, is a block diagram of a computer system in which the present invention's teachings can be practiced.
Figure 2:
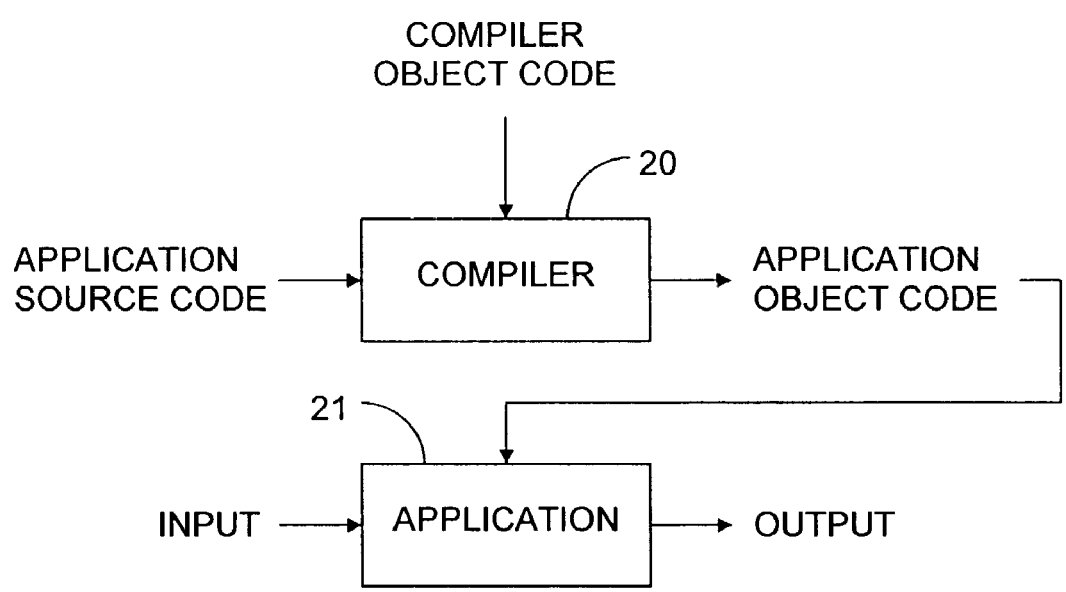
FIG. 2 as, discussed above, is a block diagram that illustrates a compiler's basic functions.
Figure 3:
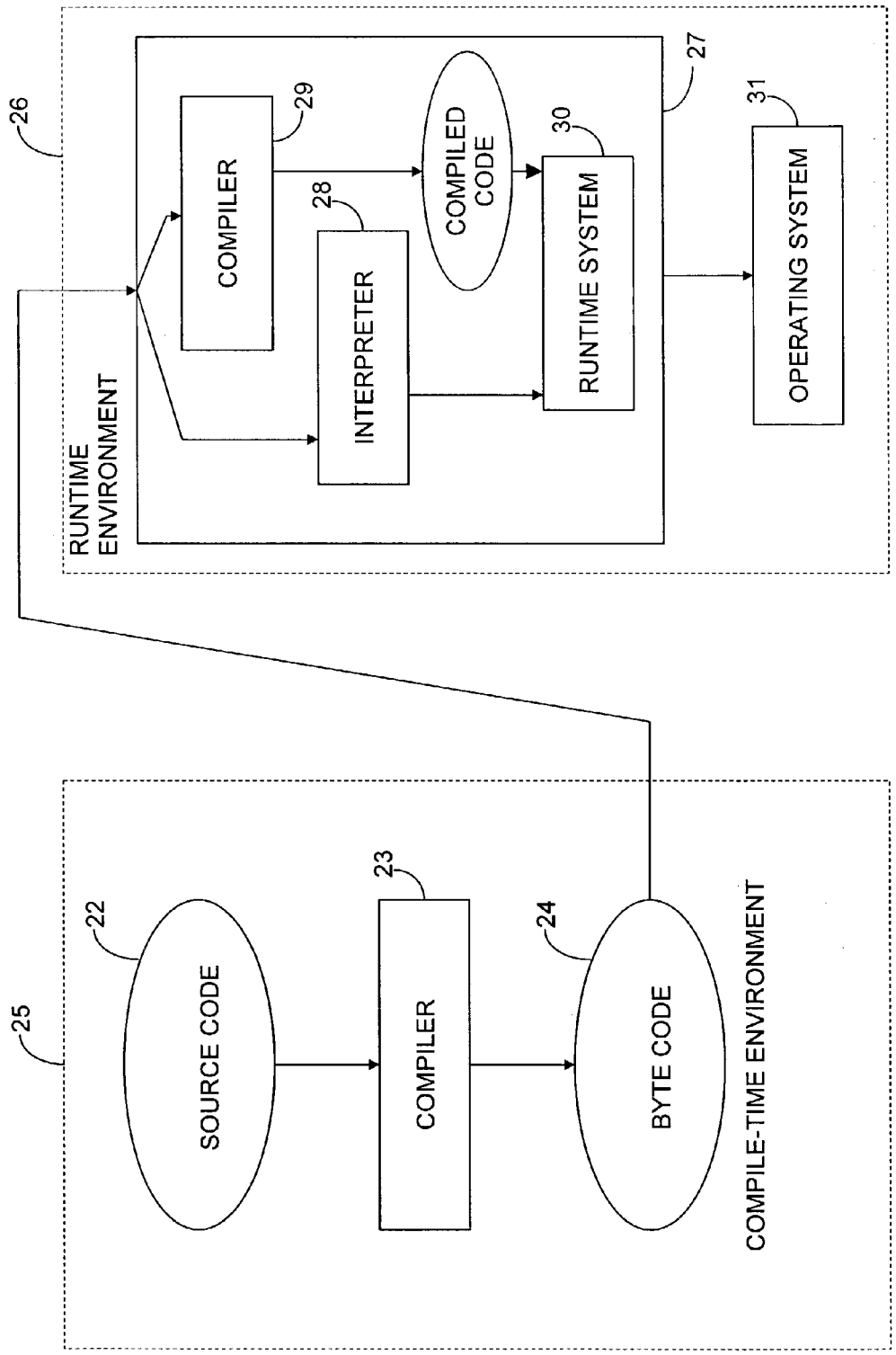
FIG. 3, discussed above, is a block diagram that illustrates a more-complicated compiler/interpreter organization.
Figure 4:
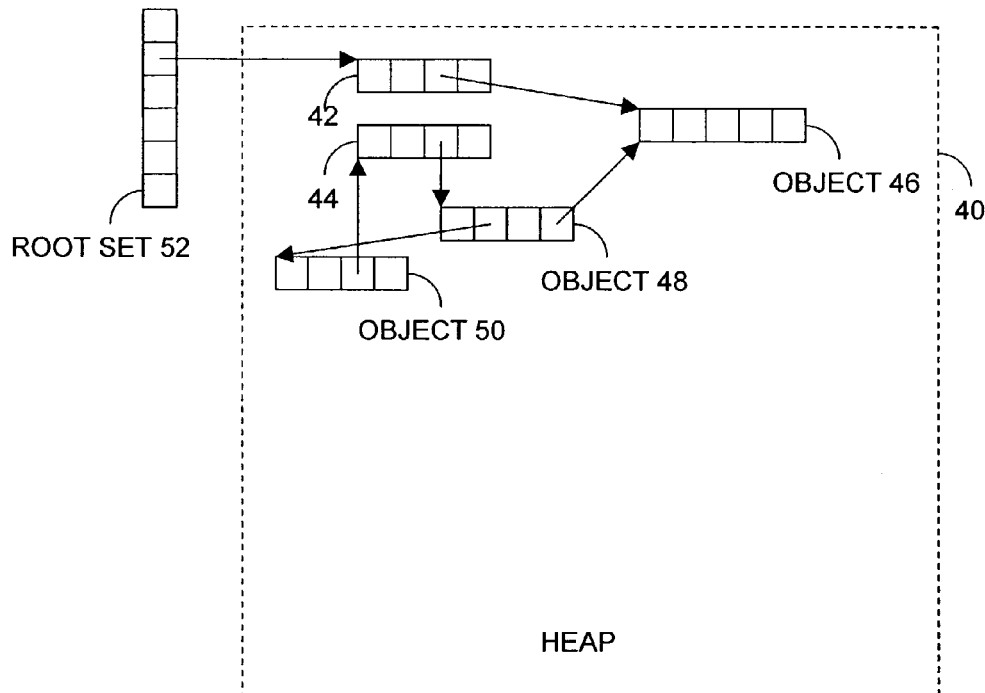
FIG. 4, discussed above, is a diagram that illustrates a basic garbage-collection mechanism.
Figure 5:
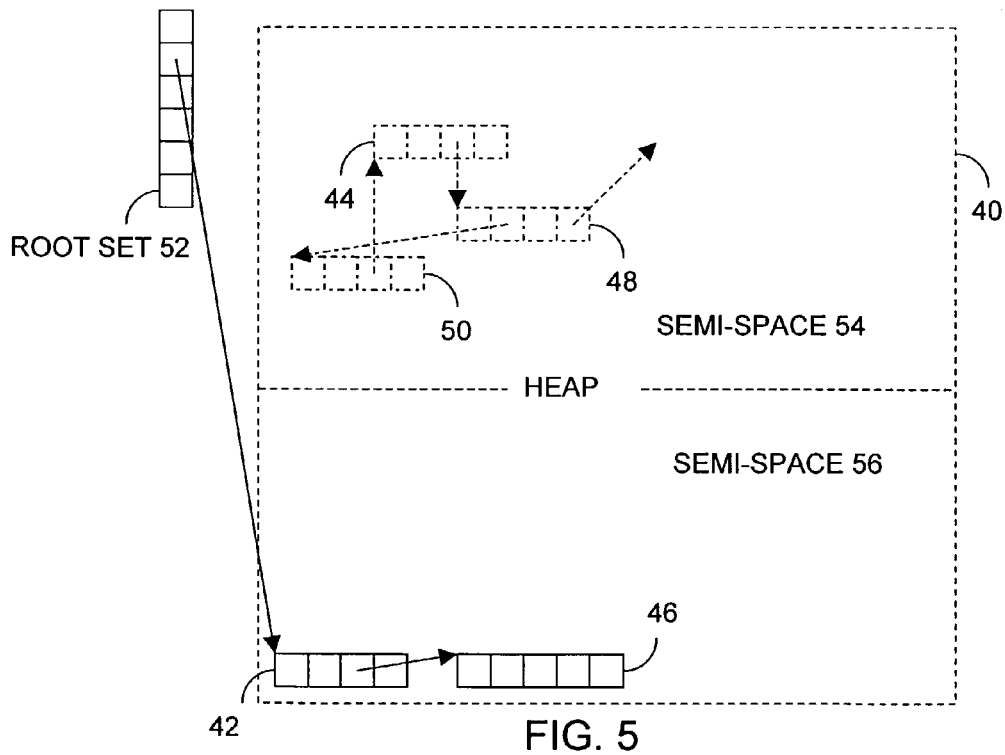
FIG. 5, discussed above, is a similar diagram illustrating that garbage-collection approach's relocation operation.
Figure 6:
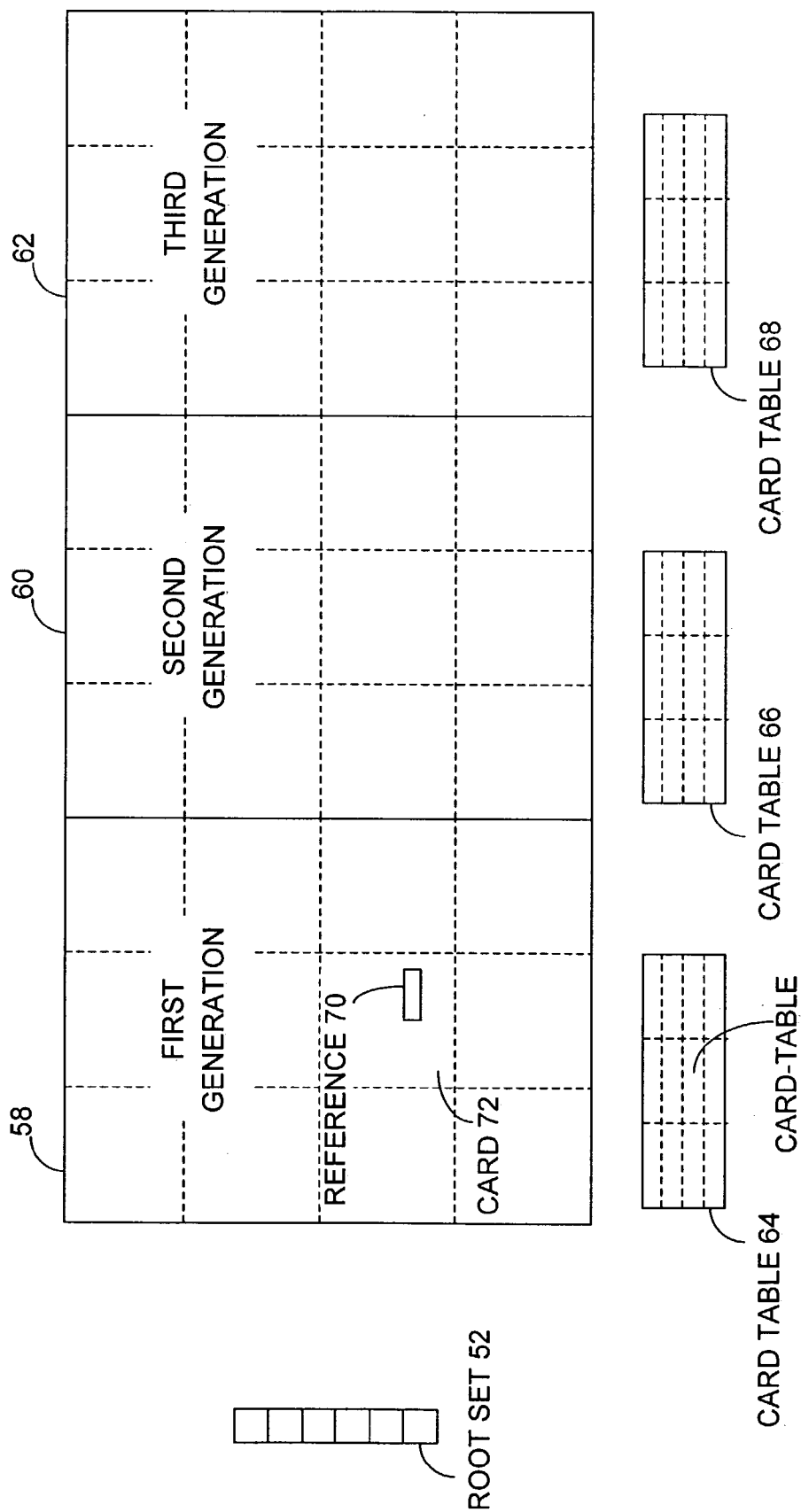
FIG. 6, discussed above, is a diagram that illustrates a garbage-collected heap's organization into generations.
Figure 7:
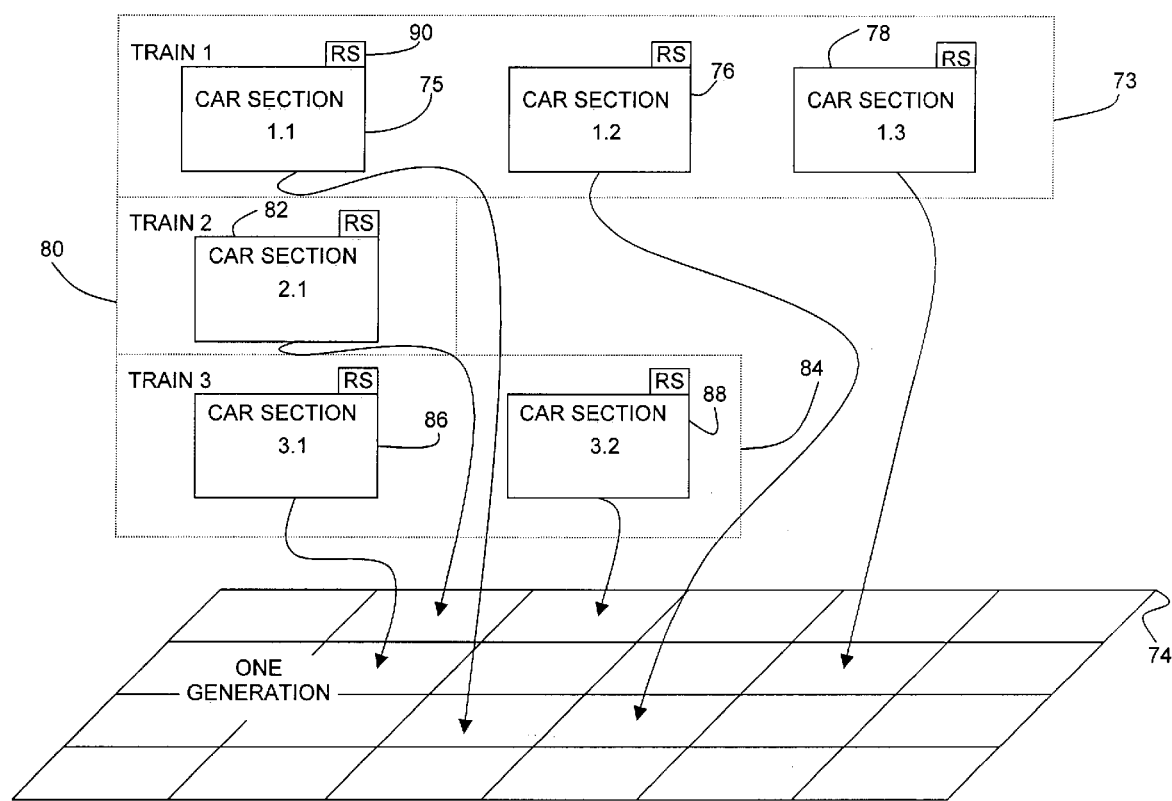
FIG. 7, discussed above, is a diagram that illustrates a generation organization employed for the train algorithm.
Figure 8A:
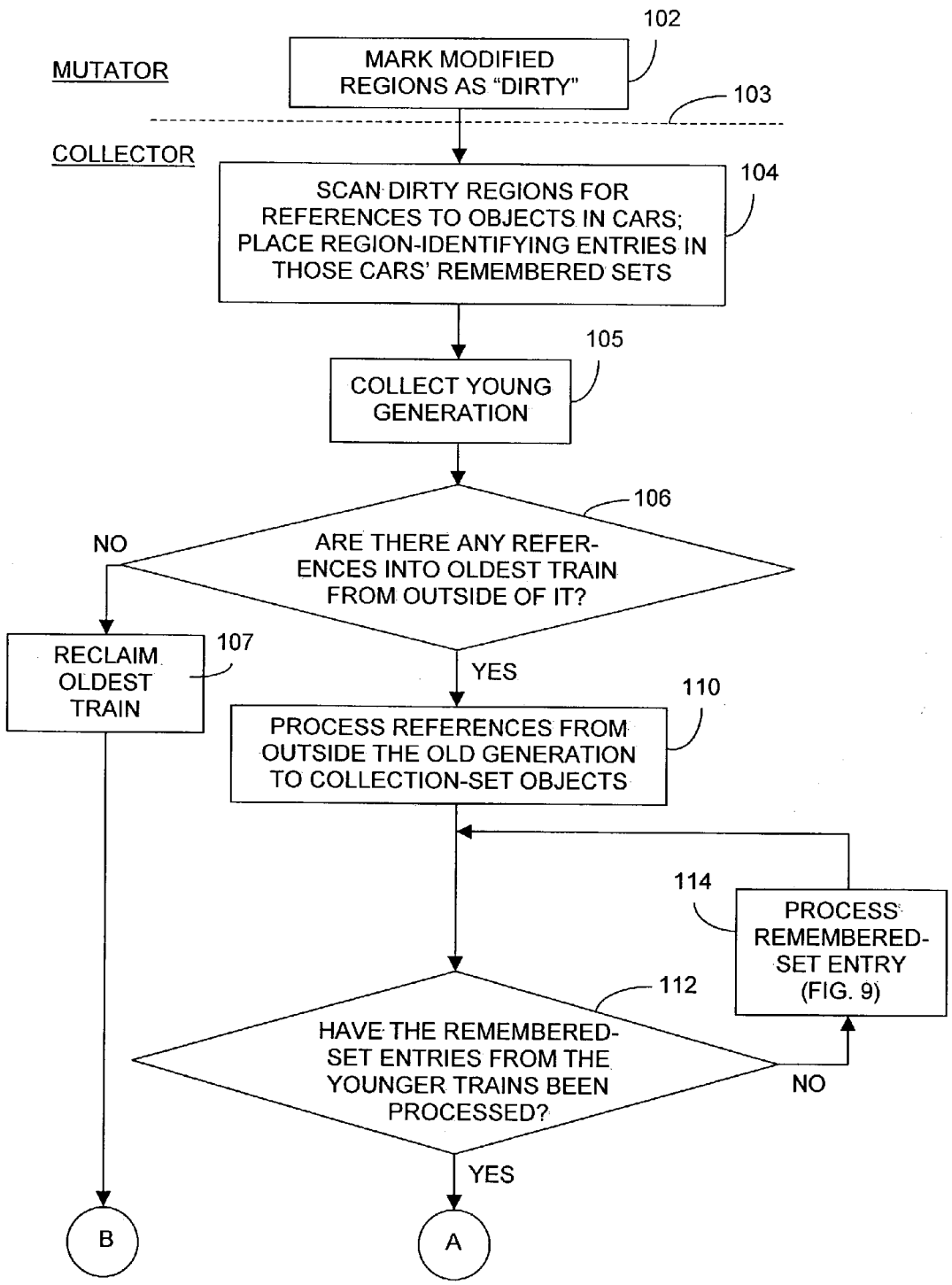
FIGS. 8A and 8B, discussed above, together constitute a flow chart that illustrates a garbage-collection interval that includes old-generation collection.
Figure 8B:
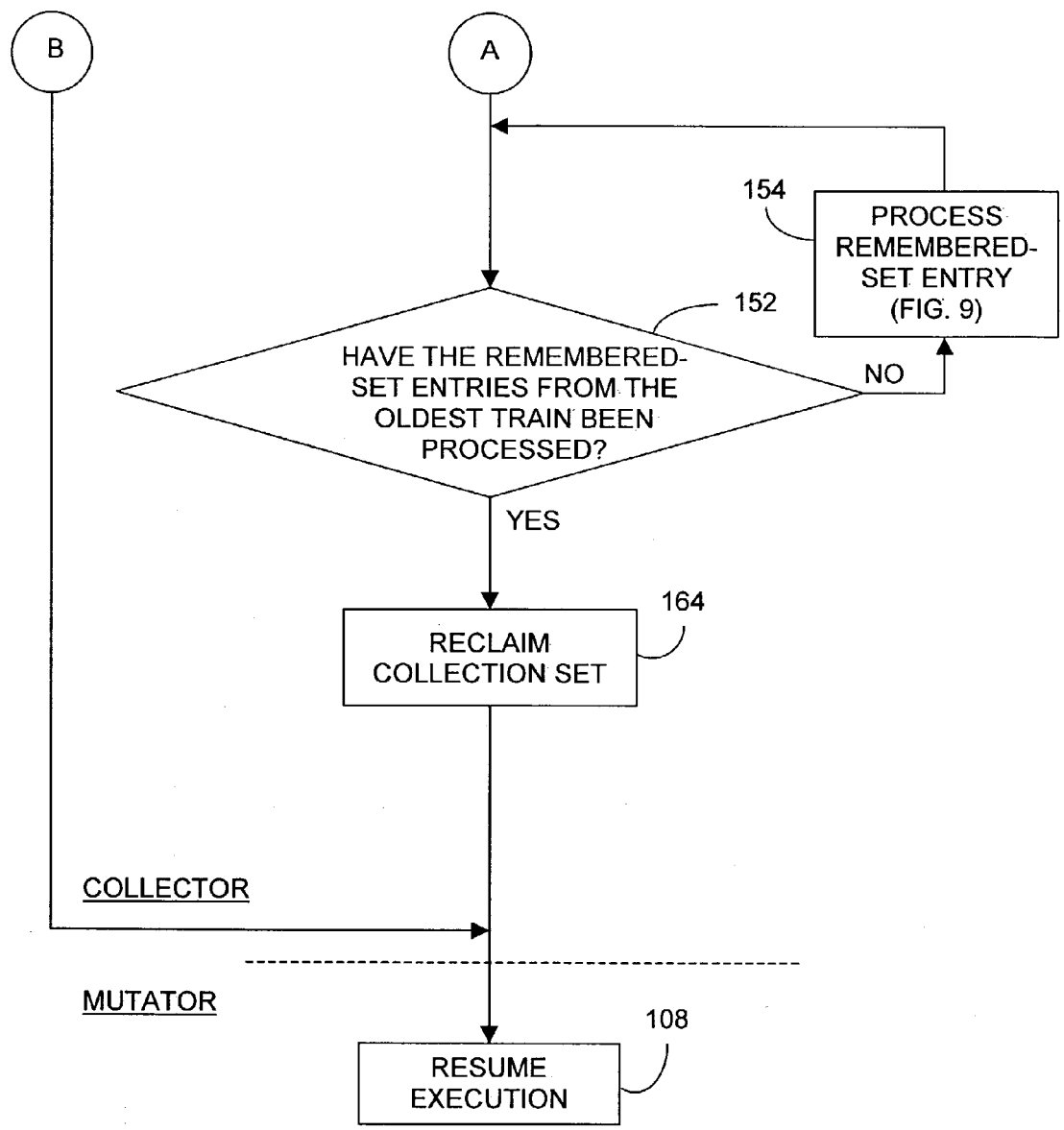
Figure 9:
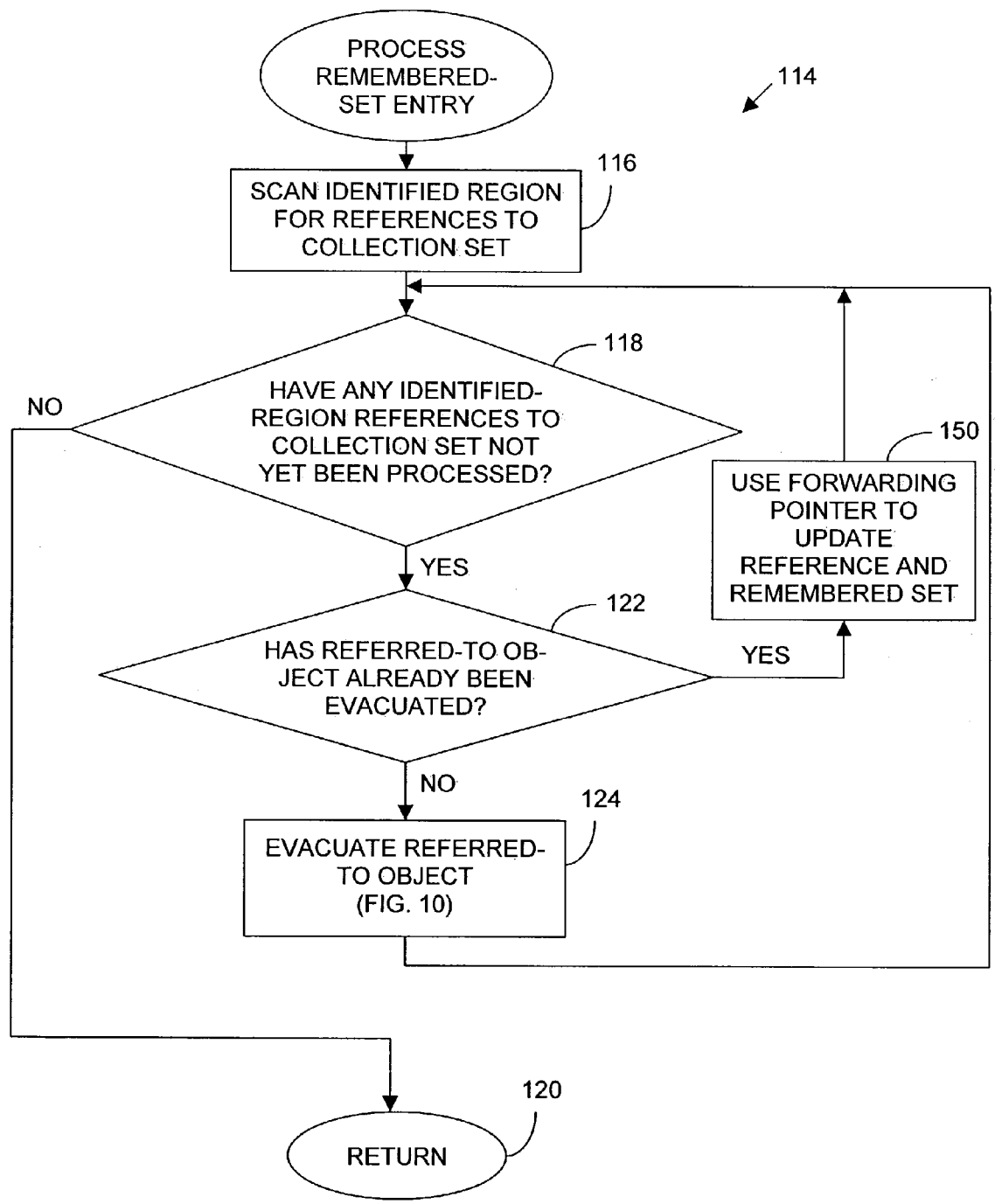
FIG. 9, discussed above, is a flow chart that illustrates in more detail the remembered-set processing included in FIG. 8A.
Figure 10:
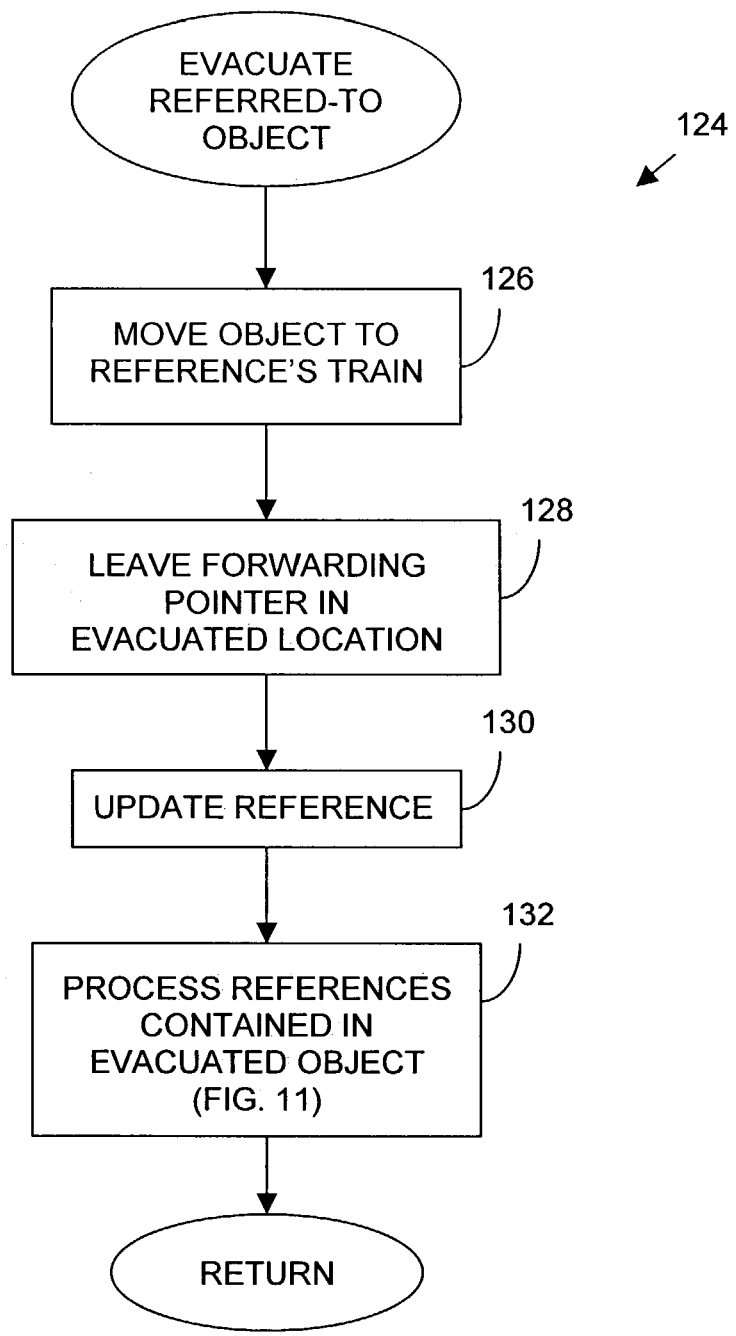
FIG. 10, discussed above, is a block diagram that illustrates in more detail the referred-to-object evacuation that FIG. 9 includes.
Figure 11A:
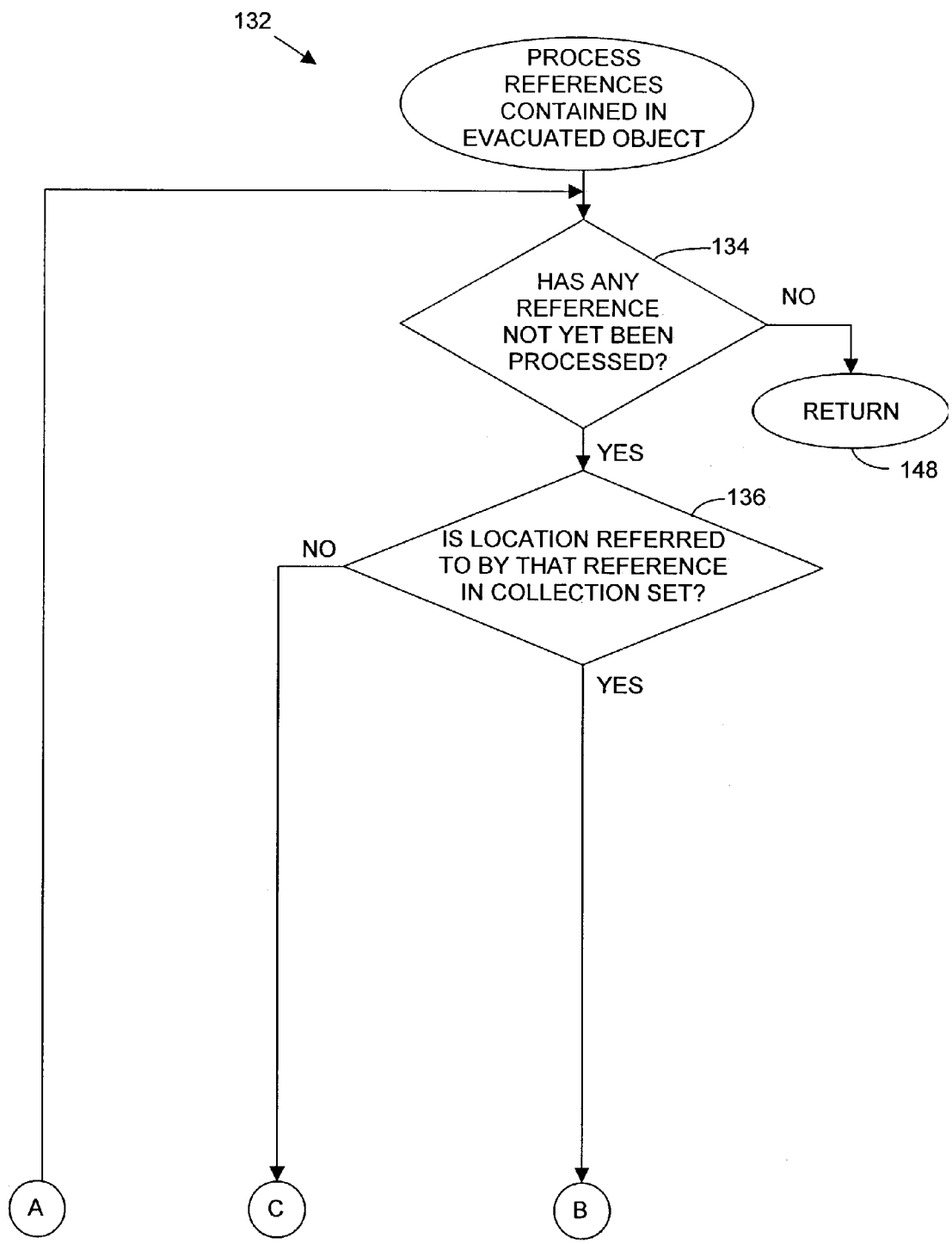
FIGS. 11A and 11B, discussed above, together form a flow chart that illustrates in more detail the FIG. 10 flow chart's step of processing evacuated objects' references.
Figure 11B:
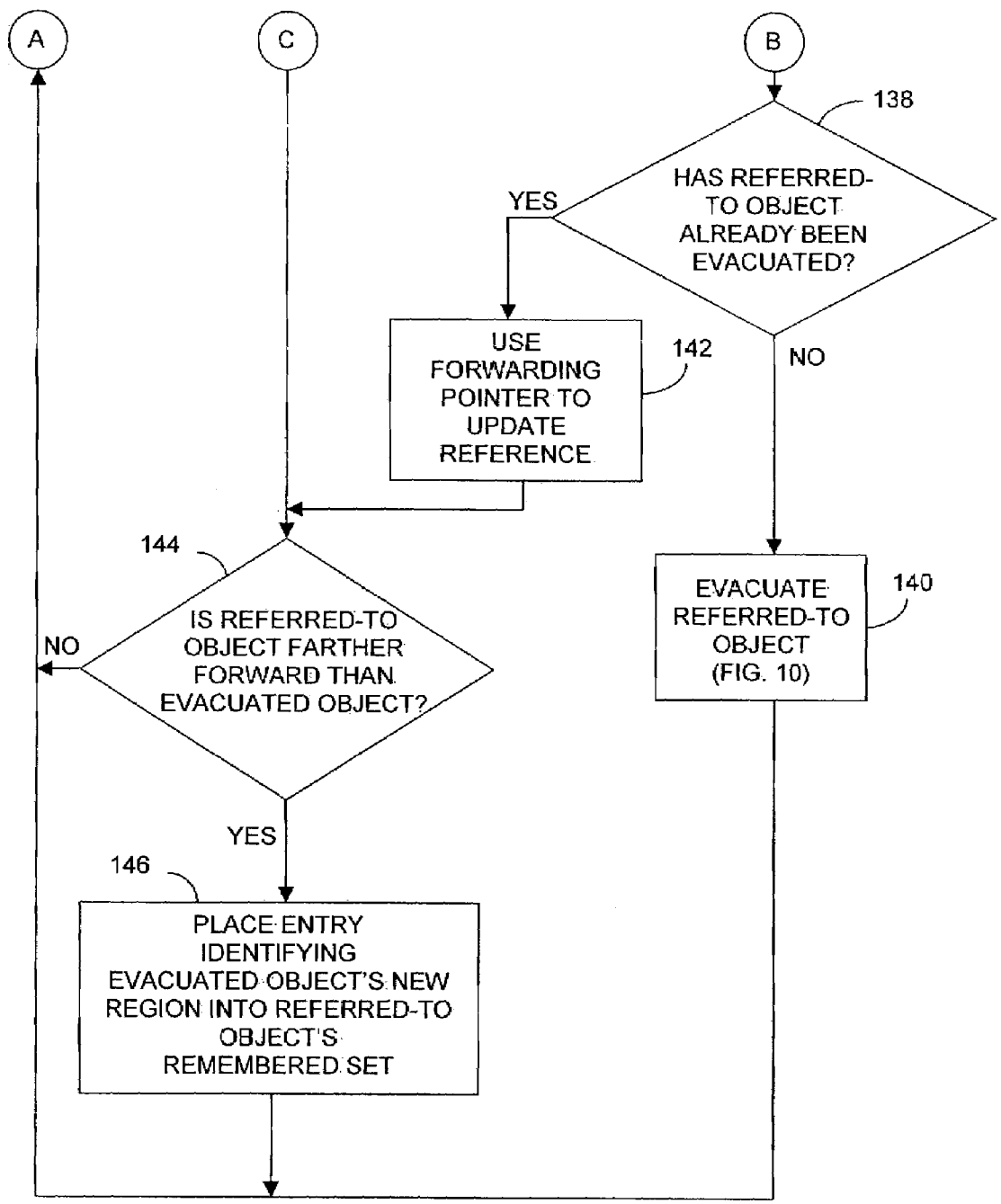

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 13 includes a step represented by block 180. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 182 and 184 indicate, it then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated and, when it does evacuate an object to a train, it evacuates to the same train each collection-set object to which a reference the thus-evacuated object refers. In any case, the collector updates the reference to the evacuated object.

When the inter-generational references into the generation have thus been processed, the garbage collector determines whether there are any references into the oldest train from outside that train. If not, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

Figure 12A:
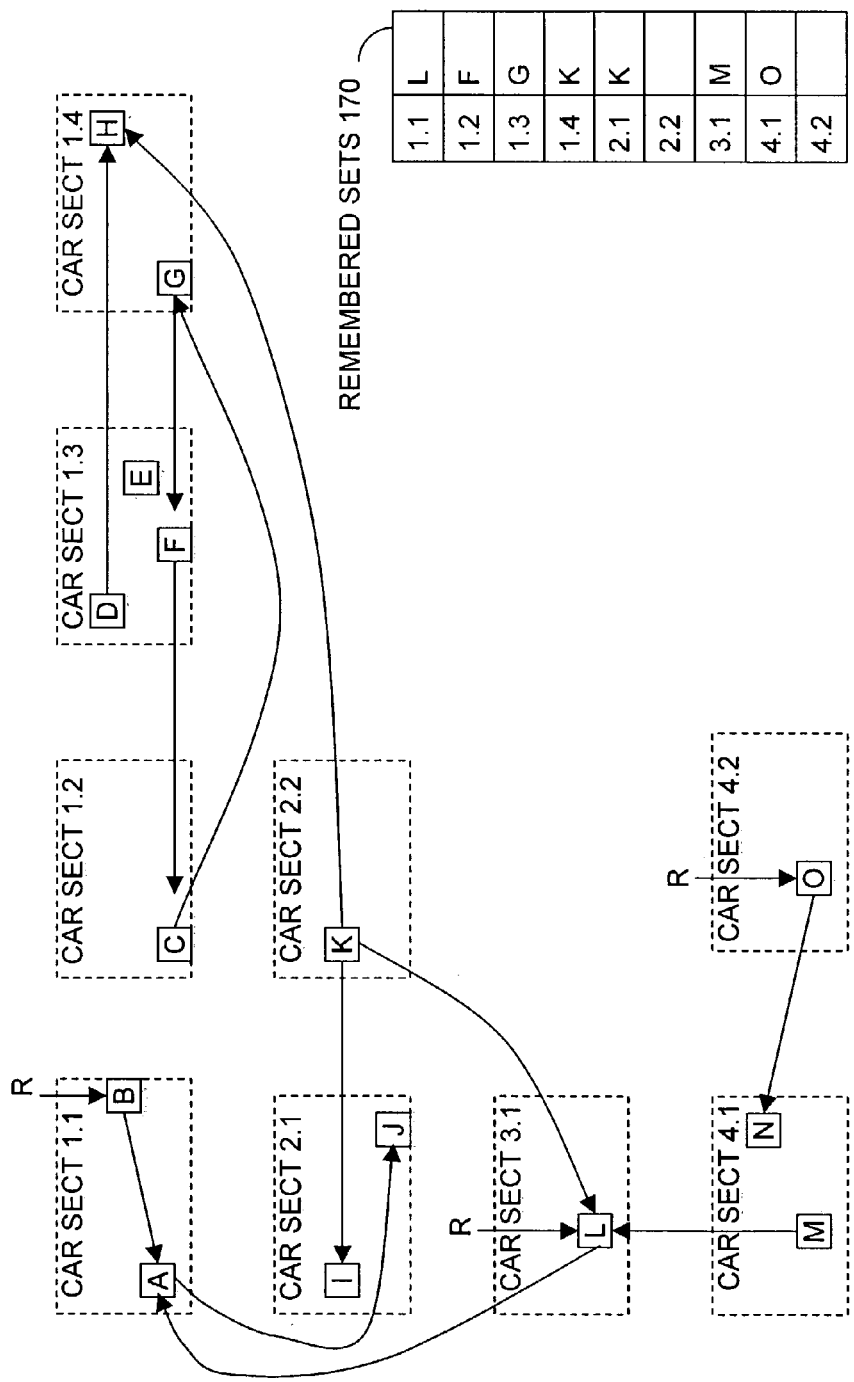
Figure 12B:
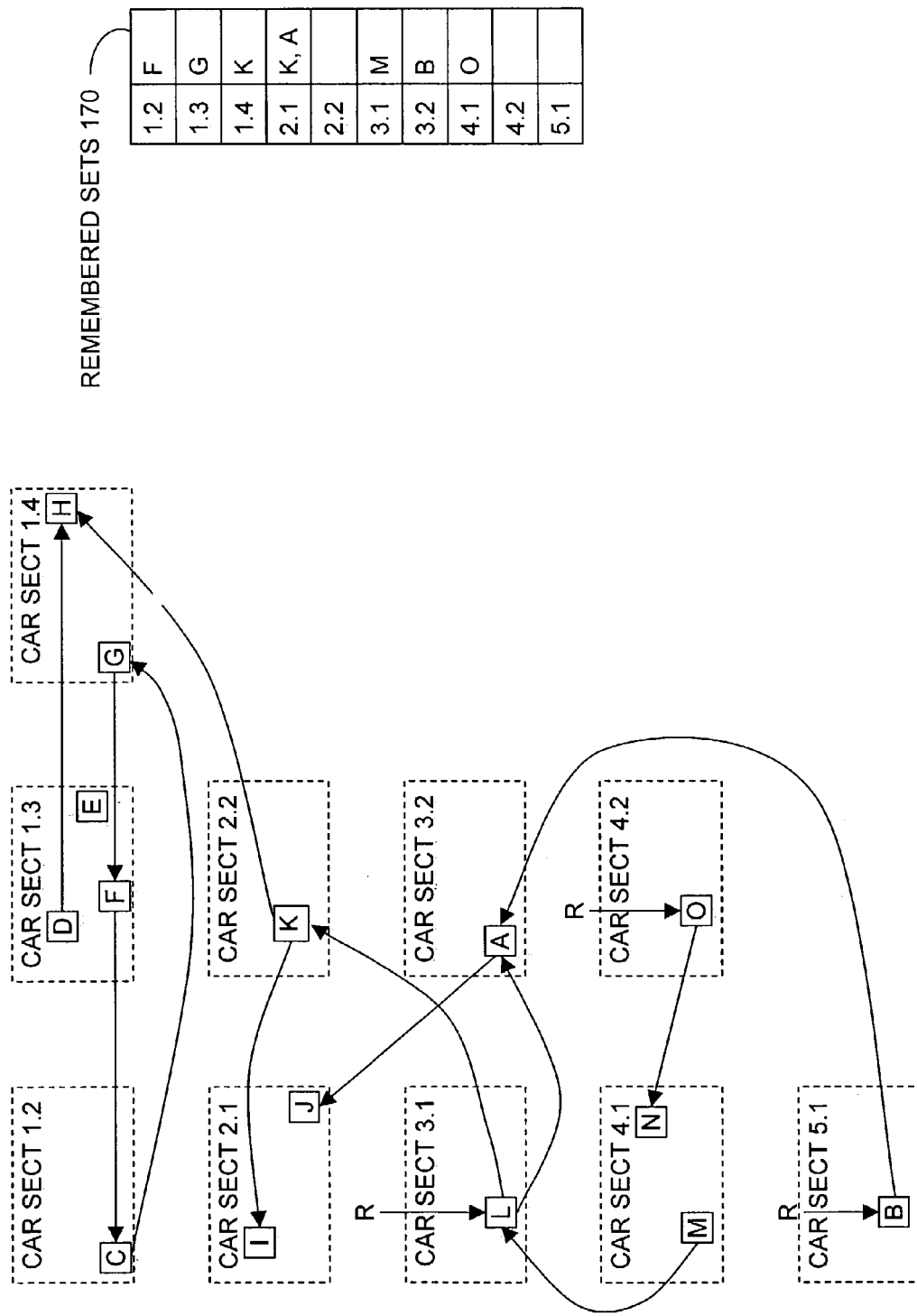
Figure 12C:
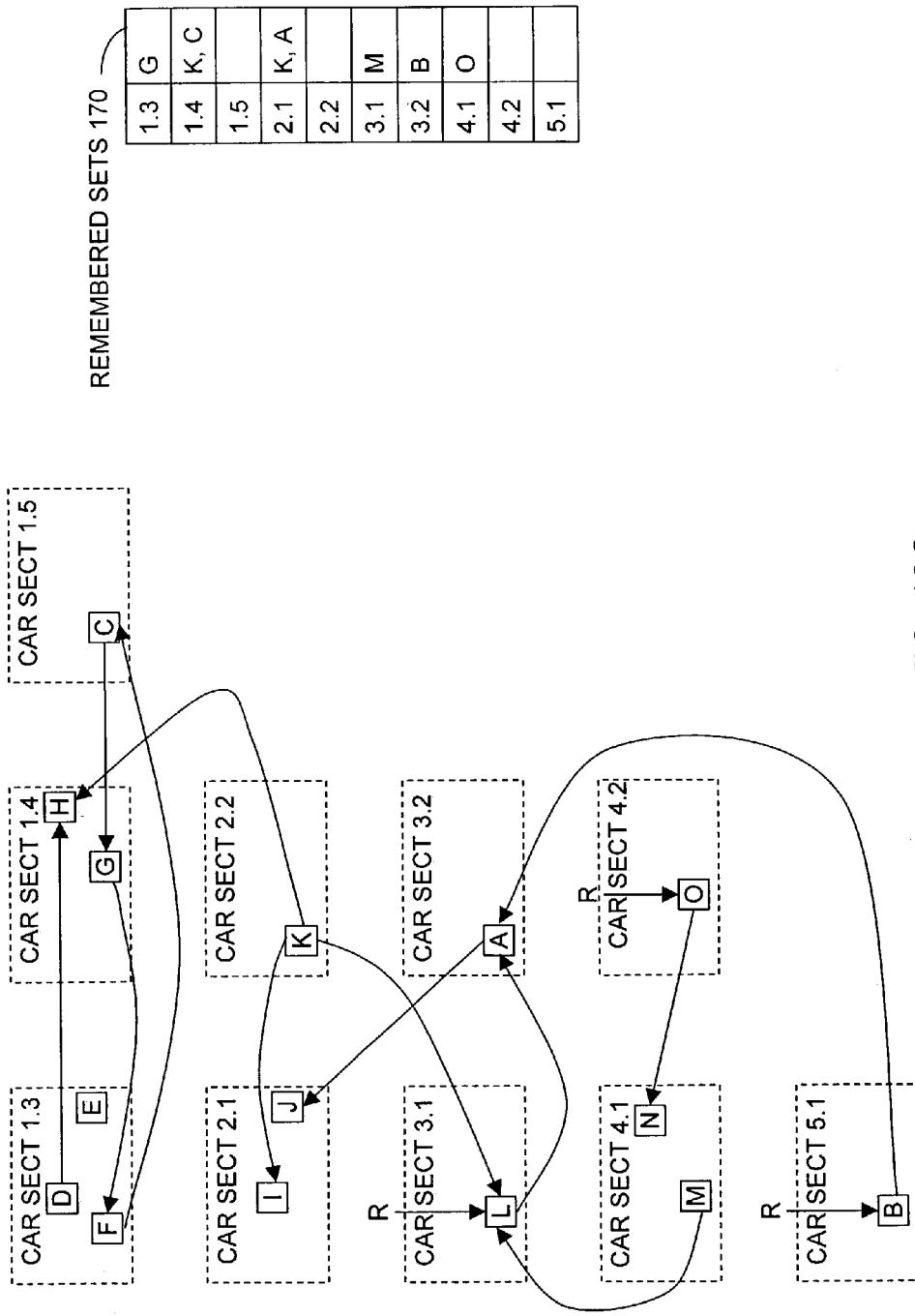
Figure 12D:
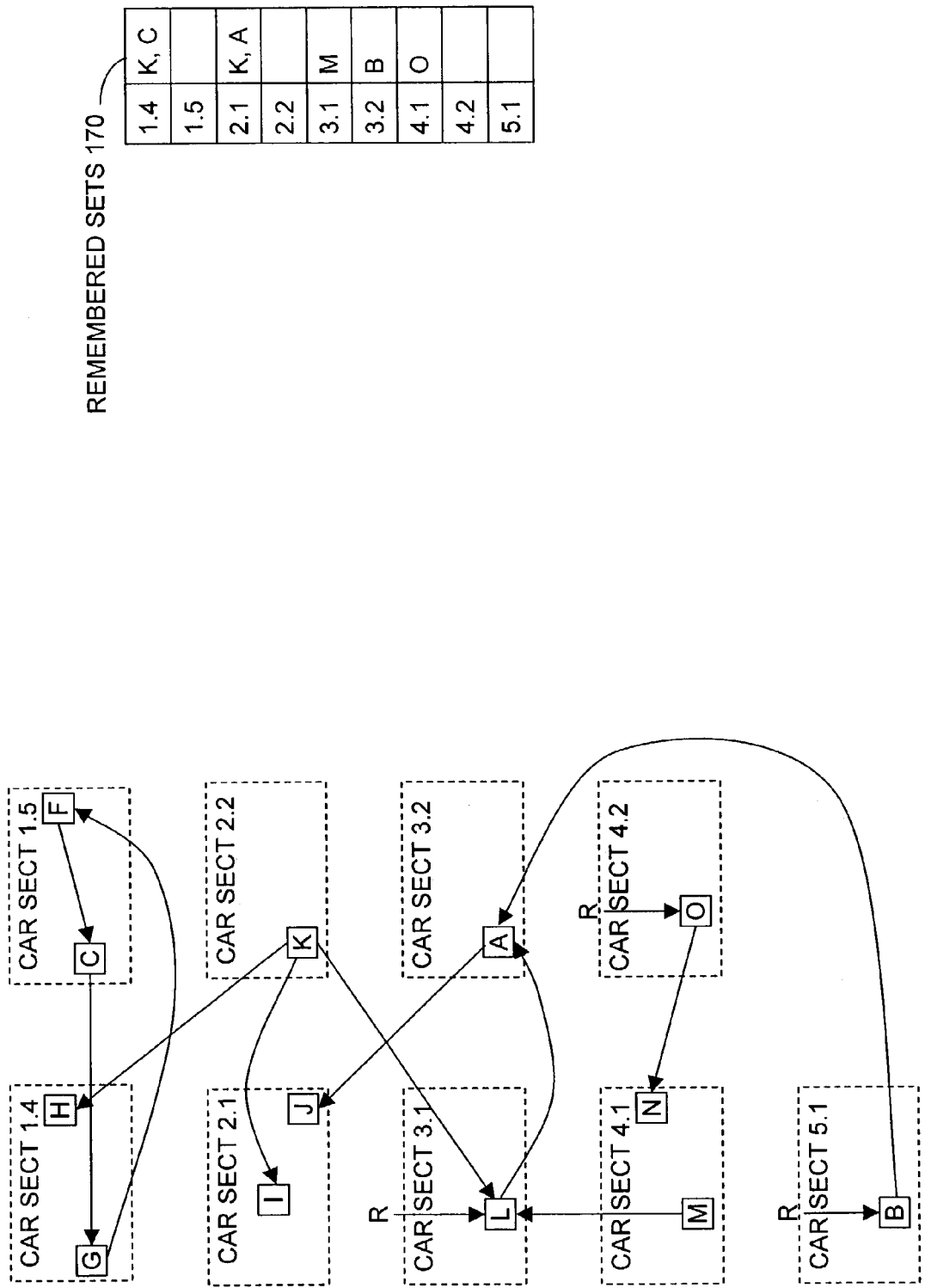
Figure 12E:
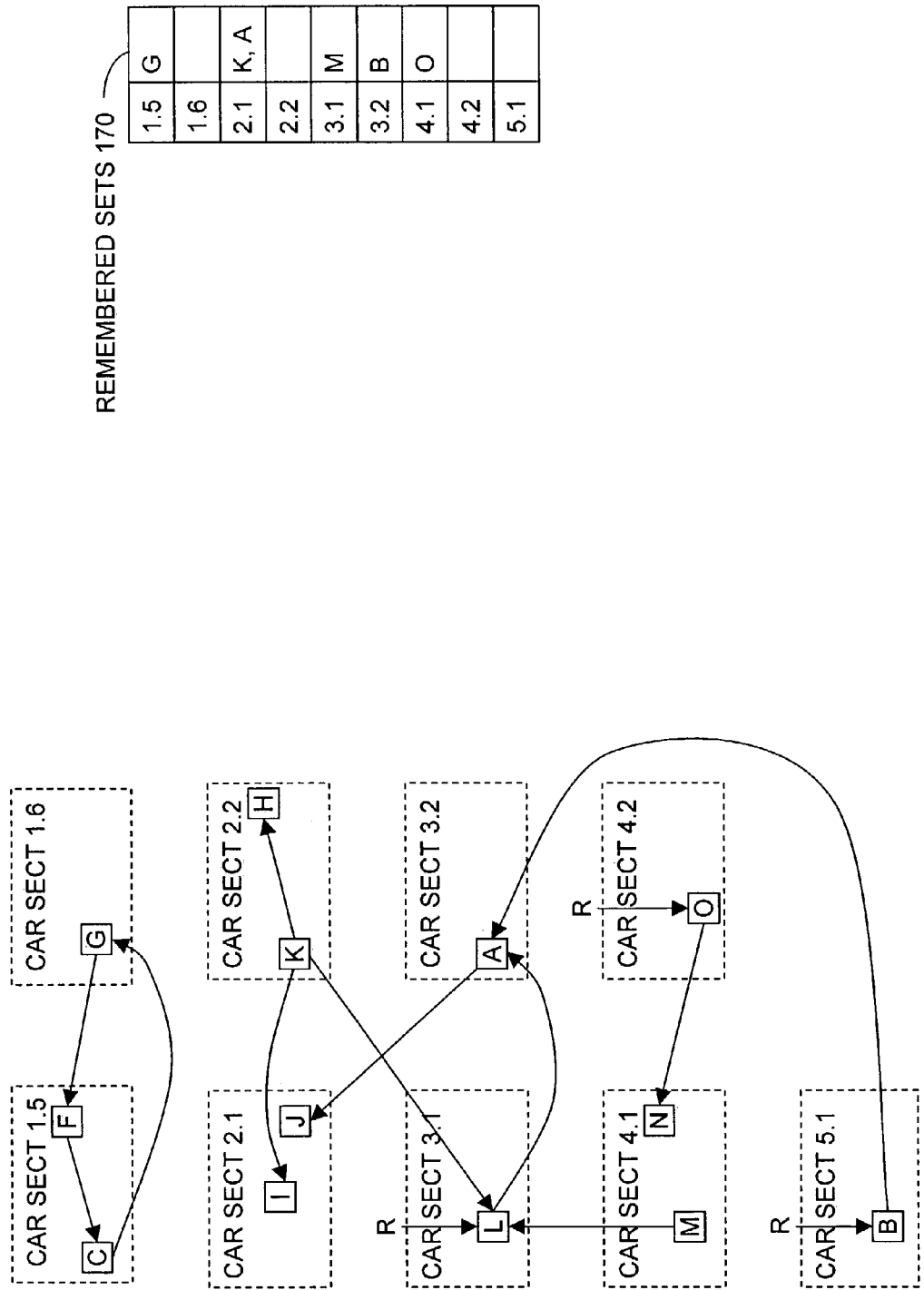
Figure 12F:
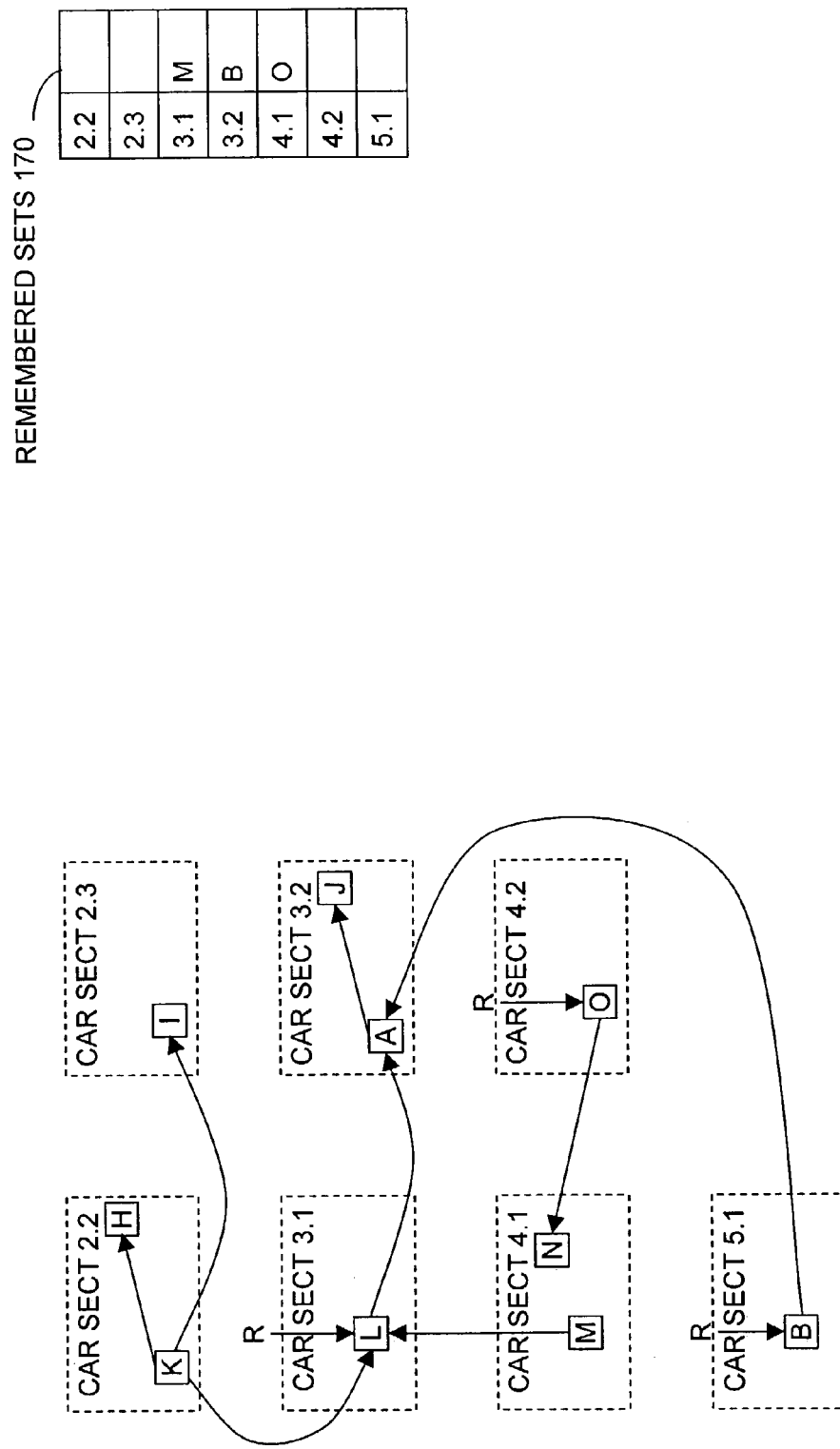
Figure 12G:
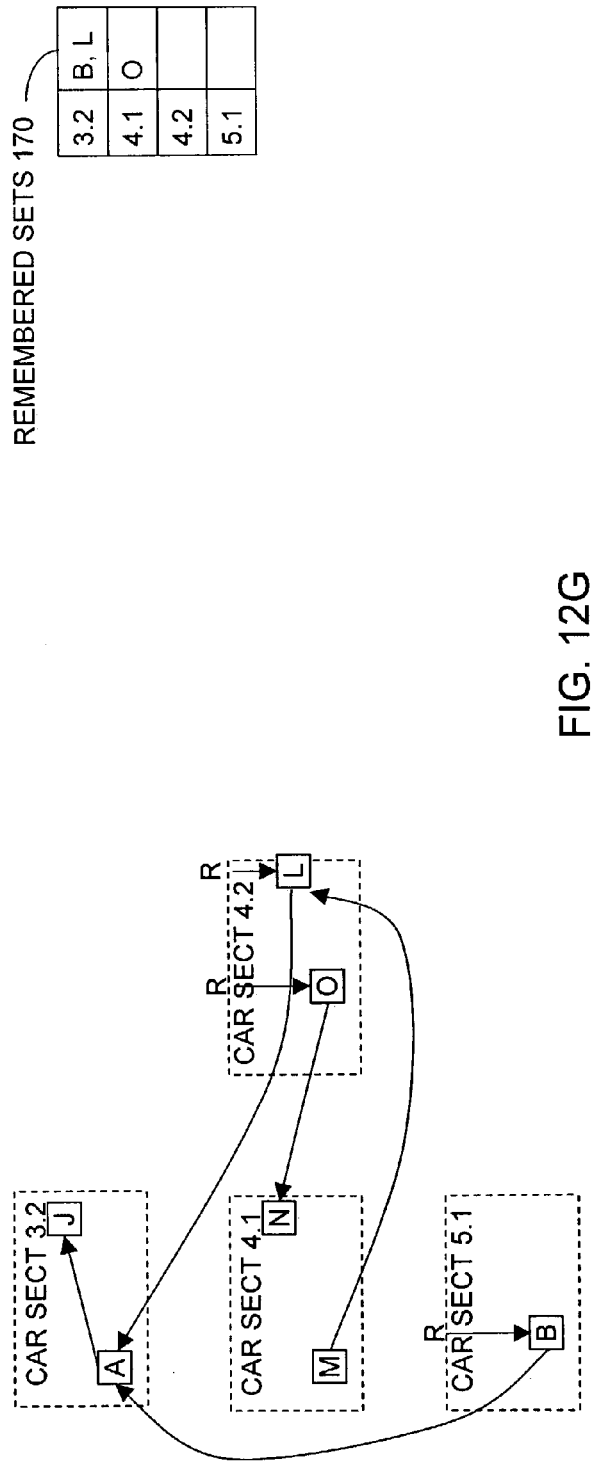
Figure 12H:
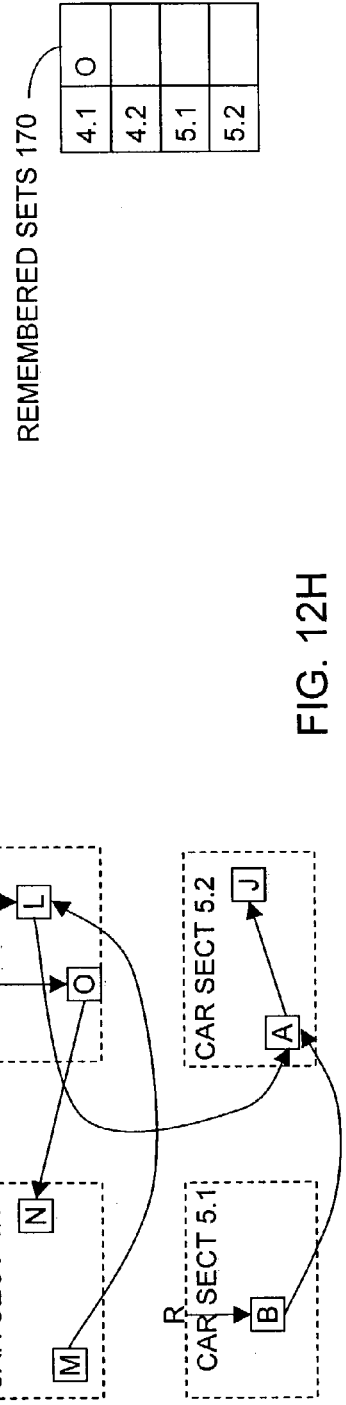

We now turn to a problem presented by popular objects. FIG. 12F shows that there are two references to object L after the second train is collected. So references in both of the referring objects need to be updated when object L is evacuated. If entry duplication is to be avoided, adding remembered-set entries is burdensome. Still, the burden in not too great in that example, since only two referring objects are involved. But some types of applications routinely generate objects to which there are large numbers of references. Evacuating a single one of these objects requires considerable reference up-dating, so it can be quite costly.

Figure 14:
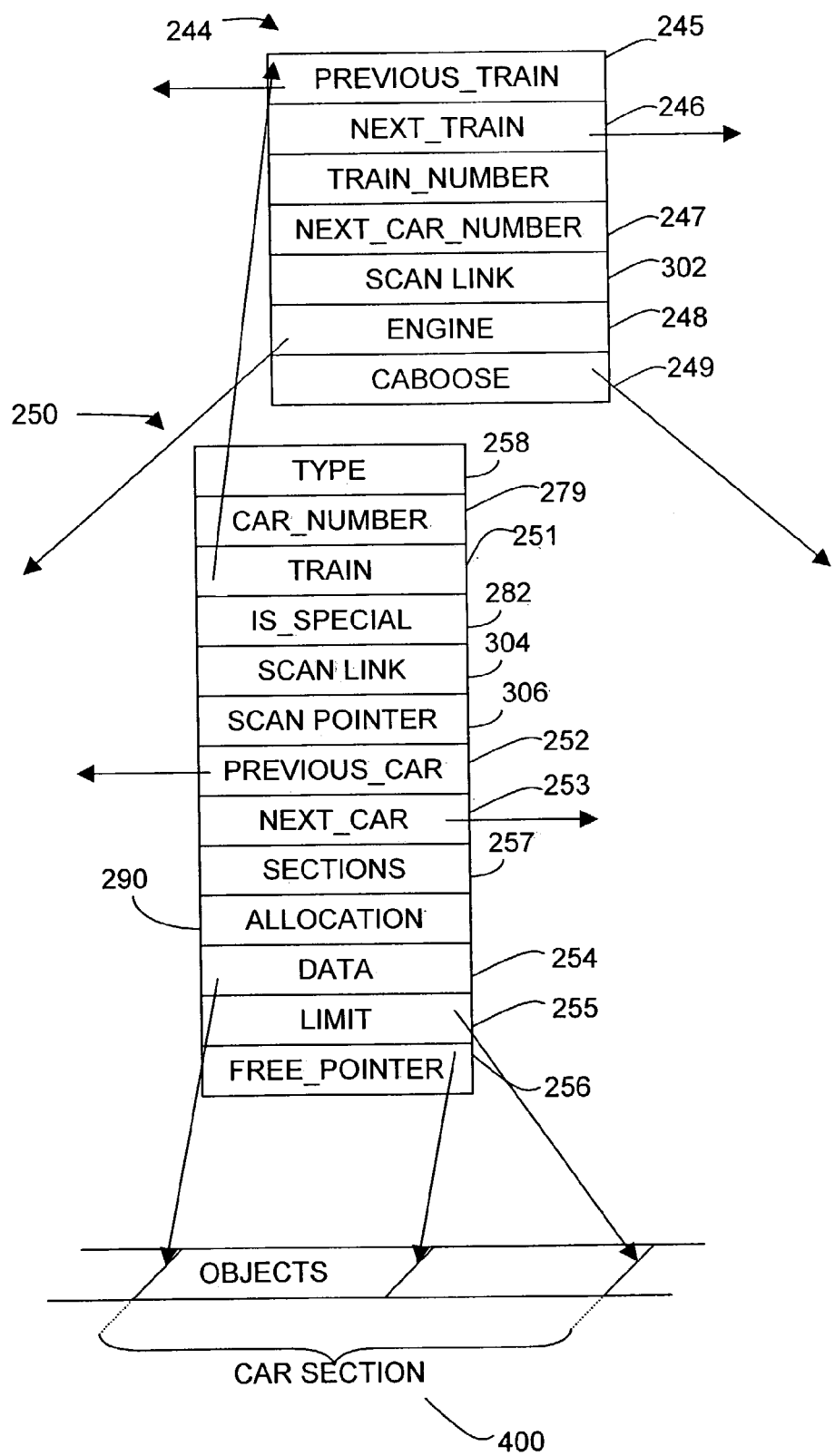
FIG. 14 is a diagram that illustrates example data structures that can be employed to manage cars and trains in accordance with the train algorithm.

One way of dealing with this problem is to place popular objects in their own cars. To understand how this can be done, consider FIG. 14's exemplary data structures, which represent the type of information a collector may maintain in support of the train algorithm. To emphasize trains' ordered nature, FIG. 14 depicts such a structure 244 as including pointers 245 and 246 to the previous and next trains, although train order could obviously be maintained without such a mechanism. Cars are ordered within trains, too, and it may be a convenient to assign numbers for this purpose explicitly and keep the next number to be assigned in the train-associated structure, as field 247 suggests. In any event, some way of associating cars with trains is necessary, and the drawing represents this by fields 248 and 249 that point to structures containing data for the train's first and last cars.

FIG. 14 depicts one such structure 250 as including pointers 251, 252, and 253 to structures that contain information concerning the train to which the car belongs, the previous car in the train, and the next car in the train. Further pointers 254 and 255 point to the locations in the heap at which the associated car section begins and ends, whereas pointer 256 points to the place at which the next object can be added to the car section.

As will be explained in more detail presently, there is a standard car-section size that is used for all cars that contain more than one object, and that size is great enough to contain a relatively large number of average-sized objects. But some objects can be too big for the standard size, so a car section may consist of more than one of the standard-size memory sections. Structure 250 therefore includes a field 257 that indicates how many standard-size memory sections there are in the car section that the structure manages.

Figure 15:
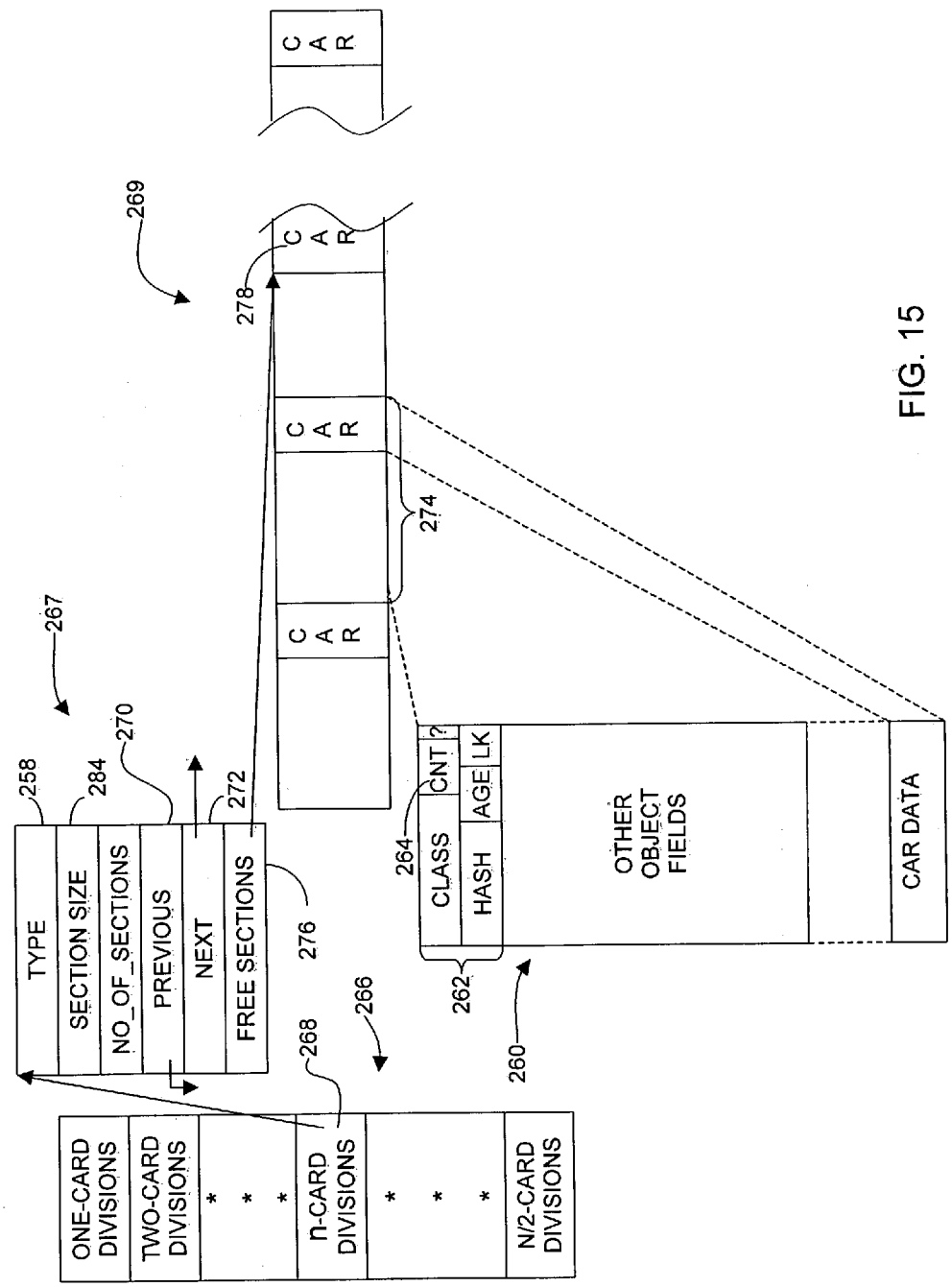
FIG. 15 is a diagram that illustrates data structures employed in managing different-sized car sections.
Figure 18:
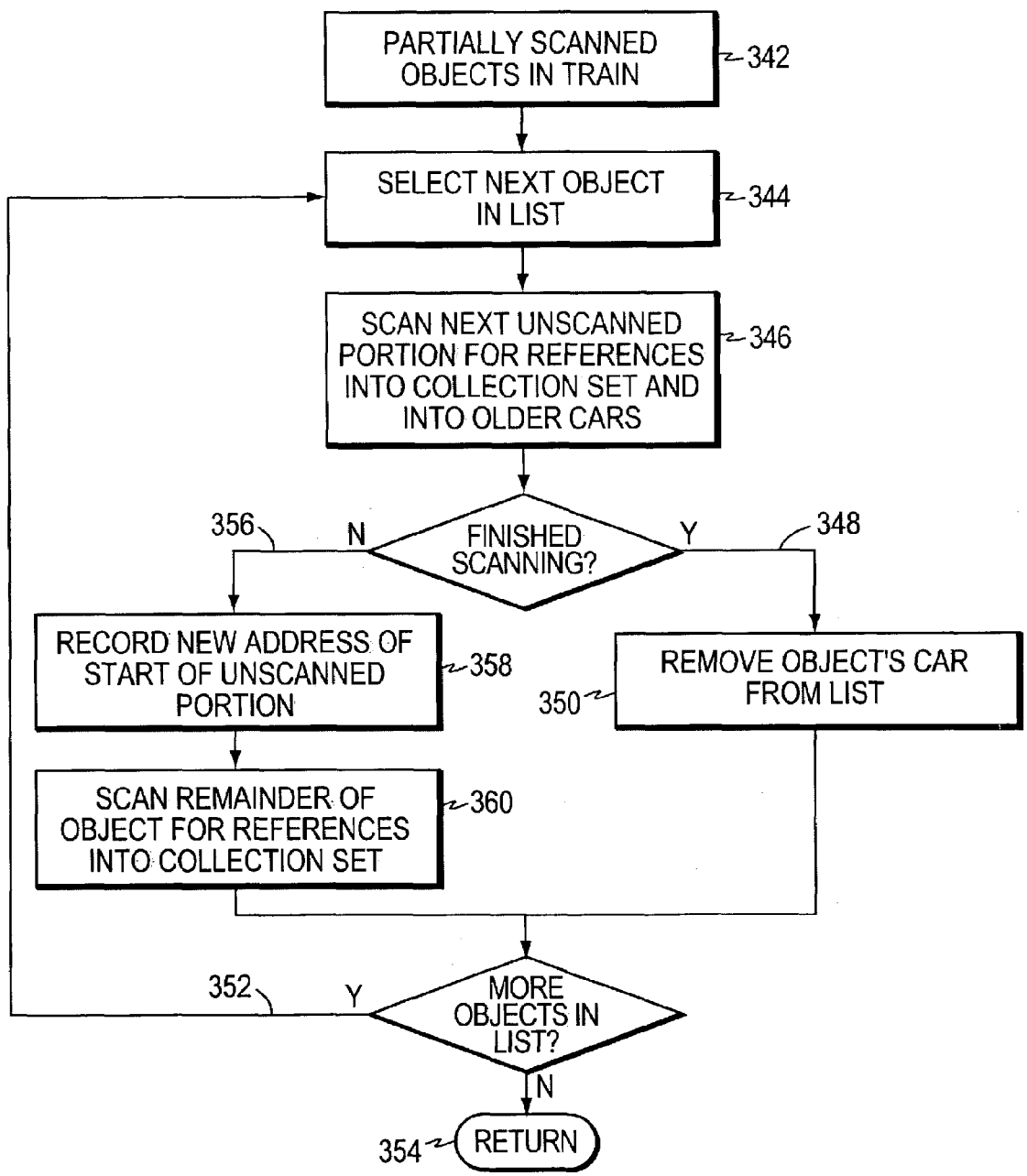

On the other hand, that structure may in the illustrated embodiment be associated not with a single car section but rather with a standard-car-section-sized memory section that contains more than one (special-size) car section. When an organization of this type is used, structures like structure 250 may include a field 258 that indicates whether the cheap space associated with the structure is used, (1) normally, as a car section that can contain multiple objects; or (2) specially, as a region in which objects are stored one to a car in a manner that will now be explained by reference to the additional structures that FIG. 15 illustrates.

To deal specially with popular objects, the garbage collector may keep track of the number of references there are to each object in the generation being collected. Now, the memory space 260 allocated to an object typically begins with a header 262 that contains various housekeeping information, such as an identifier of the class to which the object belongs. One way to keep track of an object's popularity is for the header to include a reference-count field 264 right in the object's header. That field's default value is zero, which is its value at the beginning of the remembered-set processing in a collection cycle in which the object belongs to the collection set. As the garbage collector processes the collection-set cars' remembered sets, it increments the object's reference-count field each time it finds a reference to that object, and it tests the resultant value to determine whether the count exceeds a predetermined popular-object threshold. If the count does exceed the threshold, the collector removes the object to a "popular side yard" if it has not done so already.

Specifically, the collector consults a table 266, which points to linked lists of normal-car-section-sized regions intended to contain popular objects. Preferably, the normal car-section size is considerably larger than the 30 to 60 bytes that has been shown by studies to be an average object size in typical programs. Under such circumstances, it would be a significant waste of space to allocate a whole normal-sized car section to an individual object. For reasons that will become apparent below, collectors that follow the teachings of the present invention tend to place popular objects into their own, single-object car sections. So the normal-car-section-sized regions to which table 266 points are to be treated as specially divided into car sections whose sizes are more appropriate to individual-object storage.

To this end, table 266 includes a list of pointers to linked lists of structures associated with respective regions of that type. Each list is associated with a different object-size range. For example, consider the linked list pointed to by table 266's section, pointer 268. Pointer 268 is associated with a linked list of normal-car-sized regions organized into n-card car sections. Structure 267 is associated with one such region and includes fields 270 and 272 that point to the previous and next structure in a linked list of such structures associated with respective regions of n-card car sections. Car-section region 269, with which structure. 267 is associated, is divided into n-card car sections such as section 274, which contains object 260.

More specifically, the garbage collector determines the size of the newly popular object by, for instance, consulting the class structure to which, one of its header entries points. It then determines the smallest popular-car-section size that can contain the object. Having thus identified the appropriate size, it follows table 266's pointer associated with that size to the list of structures associated with regions so divided. It follows the list to the first structure associated with a region that has constituent car sections left.

Let us suppose that the first such structure is structure 267. In-that case, the collector finds the next free car section by following pointer 276 to a car data structure 278. This data structure is similar to FIG. 14's structure 250, but in the illustrated embodiment it is located in the garbage-collected heap, at the end of the car section with which it is associated. In a structure-278 field similar to structure 250's field 279, the collector places the next car number of the train to which the object is to be assigned, and it places the train's number in a field corresponding to structure 250's field 251. The collector also stores the object at the start of the popular-object car section in which structure 278 is located. In short, the collector is adding a new car to the object's train, but the associated car section is a smaller-than-usual car section, sized to contain the newly popular object efficiently.

The aspect of the illustrated embodiment's data-structure organization that FIGS. 14 and 15 depict provides for special-size car sections without detracting from rapid identification of the normal-sized car to which a given object belongs. Conventionally, all car sections have been the same size, because doing so facilitates rapid car identification. Typically, for example, the most-significant bits of the difference between the generation's base address and an object's address are used as an offset into a car-metadata table, which contains pointers to car structures associated with the (necessarily uniform-size) memory sections associated with those most-significant bits. FIGS. 14 and 15's organization permits this general approach to be used while providing at the same time for special-sized car sections. The car-metadata table can be used as before to contain pointers to structures associated with memory sections whose uniform size is dictated by the number of address bits used as an index into that table.

In the illustrated embodiment, though, the structures pointed to by the metadata-table pointers contain fields exemplified by fields. 258 of FIG. 14's structure 250 and FIG. 15's structure 267. These fields indicate whether the structure manages only a single car section, as structure 250 does. If so, the structure thereby found is the car structure for that object. Otherwise, the collector infers from the object's address and the structure's section$_{13}$ size field 284 the location of the car structure, such as structure 278, that manages the object's special-size car section, and it reads the object's car number from that structure. This inference is readily drawn if every such car structure is positioned at the same offset from one of its respective car section's boundaries. In the illustrated example, for instance, every such car section's car structure is placed at the end of the car section, so its train and car-number fields are known to be located at predetermined offsets from the end of the car section.

As discussed herein the present invention applies to virtually any incremental re-location or compaction collector that utilizes remembered sets within a generation.

As discussed above, isolating enormous objects in one car and re-linking, rather than copying, requires that remembered sets of cars older than the re-linked car's new position in the Train algorithm may need to be updated to record references from the re-linked enormous object. That is, after re-linking, cars that are now older may be referenced from the newly re-linked enormous object, and so the enormous object must be scanned for these references and the remembered sets in these older cars must then be updated. As discussed above, in some cases this scanning will interrupt or pause the application beyond the time bounds specified. This problem is addressed in the present invention.

It is helpful to recognize that the scanning of the enormous object and insertions into the remembered sets of older cars is entirely local within a generation and to the particular collection techniques. As such, the work of scanning and remembered set insertions may be broken into parcels that are scheduled as is any other collection activity in a collection interval.

As shown in FIG. 16, an identified enormous object E is part of a collection set 320 that includes another car 1.1 with an object A 322 that is referenced from the enormous object E. Referring to FIG. 17, an enormous object E in the collection set 324 is evacuated by re-linking and marking for scanning 326. If the collection set is empty 328, the initial portion of the enormous objects is scanned for references into older cars 330. If the collection set is not empty 332, the initial portion of the enormous object is scanned for references into the collection set and for references into older cars 334. In this instance the remainder of the enormous object is scanned for references into the collection set 336.

Still referring to FIG. 17, a pointer (SCAN POINTER 306 in FIG. 14) is recorded indicating the start of the unscanned portion of the enormous object remaining after the initial portion was scanned. Next, the car containing the enormous object is placed on a per-train list of partially scanned objects 340 and control is returned.

Referring back to FIG. 14, the SCAN;LINK 302, in the train's data structure 244 tracks the car at the head of the per train list, and the SCAN LINK 304 in the car's data structure 250 tracks the next partially-scanned car in the per train list, the per train list ending with a NULL that is easy to detect.

During a subsequent collection interval, if a partially scanned object remains in the train 342 being collected, the next object is selected from the per-train list 344. The next unscanned portion is scanned for references into the collection set and into older cars 346. If the entire enormous object had been scanned 348, the car containing that object is removed from the list 350. If more objects remain on the per-train list, the next object in the list is processed 344, if not control is returned 354.

If the scanning of the next portion does not complete the scanning of the object 356, a new address of the start of the unscanned portion is recorded 358, and the remainder of the object is scanned for references into the collection set. In a preferred embodiment, the preset amount of an enormous object to be scanned in an interval is the same number of words, for example, as a normal sized car section. But, other arbitrary preset amounts may be used, e.g. a (small) multiple of the size of a given number of objects in older cars updated, or a given time delay.

As described above, scanning work may be interspersed with collection of other cars. However, in general, this requires explicit scanning of the remaining unscanned portions of any not-fully-scanned enormous objects for references into these other cars. One exception is for cars containing objects that have been directly allocated since the last collection interval. Allocated objects will have no initial references from the generation. In these cases, much more selective scanning is possible using these summary data structures together with direct information from write barriers.

It has been found that newly promoted objects can be partially scanned, as discussed above, for enormous objects evacuated during the collection of an increment.

The present invention in the preferred embodiments described above may be used to advantage in concurrent, incremental stop the world, or similar collector algorithms to better schedule such scanning activities, allow shorter collection intervals, and in general tradeoff collecting enormous objects and typical reclaiming of memory.

Collecting enormous objects by incremental scanning can occur concurrently with collecting other generations and or with an application. For example, in the current preferred embodiment collecting a generation involves broadcasting that start and end of the collection activity. A generation might exploit this technique and use these notifications to initiate scanning and check for the need to suspend the scanning once the other generation is finished collecting. This is permissible since the scanning for references in remembered sets are internal to the generation. In the case of collection of other generations, references to objects in the generation from other generations are only modified with the cooperation of that generation. In the case of concurrent applications, write barriers suffice to indicate where changes have been made.

What is claimed is:

1. In a computer-implemented garbage collector operating in a computer having a heap memory and based on the Train algorithm in which a car represents a fixed-size region of the heap memory, a process for collecting enormous objects, each of which is substantially larger than the fixed-size memory region represented by a car, and for reference insertions into remembered sets of other cars, the process comprising the steps of: including at least one enormous object as part of a collection set, evacuating the enormous object by re-linking, finding an unscanned portion of the enormous object, scanning a preset amount of the unscanned portion for references to objects in other cars, wherein if a reference to an object in another car is found, updating the remembered set of that other car, and scanning the enormous object for references into the collection set, if the collection set is not empty.

2. The process of claim 1 further comprising the step of saving the location of the unscanned portion of the enormous object.

3. The process of claim 1 further comprising the step of returning to the collection process if no unscanned portion of the enormous object is found.

4. The process of claim 1 further comprising the steps of: if the collection set includes at least one other object, scanning the enormous object for references to the at least one other object, and, if any such references are found, re-locating the at least one other object if it has not already been relocated, and updating the references in the re-linked enormous object to reflect the new location of the at least one other object.

5. The process of claim 2 further comprising the steps of: finding references in the relocated at least one other object to other objects in older cars and updating the remembered sets of the older cars with respect to the relocated at least one other object.

6. The process of claim 2 further comprising the steps of; finding the at least one other object in another car in the collection set, scanning the enormous object for references to the at least one other object, and, if any such references are found, re-locating the at least one object if it has not already been relocated, and updating the references in the re-linked enormous object to reflect the new location of the at least one other object.

7. The process of claim 1, wherein at least one other car with at least one other object is in the collection set, the process further comprising the steps of: re-locating the at least one other object, scanning the enormous object for references to the at least one other object, if such a reference is found, updating the reference to the relocated object, and scanning the relocated at least one other object for references to other objects in other cars and updating the remembered sets of the other cars with respect to the relocated at least one other object.

8. The process of claim 1 further comprising the steps of: maintaining for each train a list of partially scanned enormous objects wherein in each collection increment some unscanned portion of some of these partially scanned objects is scanned for references to objects in other cars, wherein if a reference to an object in another car is found, updating the remembered set of that other car, and scanning the remaining unscanned portion of the enormous objects in each pertrain list for references into the collection set, if the collection set is not empty.

9. An electronic computer controlled train/car collector operating in a computer having a heap memory, wherein a car represents a fixed-size region of the heap memory for collecting enormous objects, each of which is substantially larger than the fixed-size memory region represented by a car, and inserting references into remembered sets of other cars, the collector comprising: a collection set including at least one enormous object, means for evacuating the enormous object by re-linking, means for finding an unscanned portion of the enormous object, means for scanning a preset amount of the unscanned portion for references to objects in other cars, wherein if a referenced to an object in an other car is found, means for updating the remembered set of that other car, and means for scanning the enormous object for references into the collection set, if the collection set is not empty.

10. The collector of claim 9 further comprising means for saving the location of the unscanned portion of the enormous object.

11. The collector of claim 9 further comprising means for returning to the collection process, if no unscanned portion of the enormous object is found.

12. The collector of claim 10, wherein if the collection set includes at least one other object, further comprising: means for scanning the enormous object for references to the at least one other object, and, if any such references are found, means for re-locating the at least one other object if it has not already been relocated, and; means for updating the references in the re-linked enormous object to reflect the new location of the at least one other object.

13. The collector of claim 10 further comprising: means for finding references in the relocated at least one other object to other objects in other cars, and means for updating the remembered sets of the other cars with respect to the relocated at least one other object.

14. The collector of claim 10 further comprising: at least one other object in another car in the collection set, means for re-locating the at least one object, means for scanning the enormous object for references to the at least one other object, and, if any such references are found, means for updating the references in the re-linked enormous object.

15. The collector of claim 9, wherein at least one other car with at least one other object is in the collection set, the collector further comprising: means for re-location the at least one other object, means for scanning the enormous objects for references to the at least one other object, and if such a reference is found, means for updating the reference to the relocated at least one other object means for scanning the relocated at least one other object for references to other objects in other cars and updating the remembered sets of the other cars with respect to the re-located at least one other object.

16. The collector of claim 9 further comprising: means for maintaining for each train a list of partially scanned enormous objects wherein in each collection increment some unscanned portion of some of these partially scanned objects is scanned for references to objects in other cars, wherein if a reference to an object in another car is found, updating the remembered set of that other car, and means for scanning the remaining unscanned portion of the enormous objects in each per-train list for references into the collection set, if the collection set is not empty.

17. A computer readable media comprising: the computer readable media containing instructions for executing in a processor of a computer having a heap memory for the practice of a garbage collection process which operates on heap memory regions that have a fixed, equal size, the garbage collection process including at least one enormous object, which is substantially larger than a memory region size, as part of a collection set, evacuating the enormous object by re-linking, finding an unscanned portion of the enormous object, scanning a preset amount of the unscanned portion for references to objects in other cars, wherein if a reference to an object in another car is found, updating the remembered set of that other car, and scanning the enormous object for references into the collection set, if the collection set is not empty.

18. The computer readable media of claim 17 comprising further readable media containing instructions for execution in a processor for the practice of the process of claim 15 further including the step of saving the location of the unscanned portion of the enormous object.

19. The computer readable media of claim 17 comprising further readable media containing instructions for execution in a processor for the practice of the process of claim 16 further including the step of returning to the collection process if no- unscanned portion of the enormous object is found.

20. The computer readable media of claim 17 comprising further readable media containing instructions for execution in a processor for the practice of the process of claim 16 further including the step of steps of: if the collection set includes at least one other object, scanning the enormous object for references to the at least one other object, and, if any such references are found, re-locating the at least one other object if it has not already been relocated, and, updating the references in the re-linked enormous object to reflect the new location of the at least one other object.

21. The computer readable media of claim 18 comprising further readable media containing instructions for execution in a processor for the practice of the process of claim 15 further including the step of: finding references in the relocated at least one other object to other objects in other cars and updating the remembered sets of the other cars with respect to the relocated at least one other object.

22. The computer readable media of claim 18 comprising further readable-media containing instructions for execution in a processor for the practice of the process of claim 16 further including the step of; finding the at least one other object in another car in-the collection set, scanning the enormous object for references to the at least one other object, and, if any such references are found, re-locating the at least one object if it has not already been relocated, and, updating the references in the re-linked enormous object to reflect the new location of the at least one other object.

23. The computer readable media of claim 17 comprising further readable media containing instructions for execution in a processor for the practice of the process of claim 15, wherein at least one other car with at least one other object is in the collection set, the process further including the steps of: re-locating the at least one other object, scanning the enormous object for references to the at least one other object, if such a reference is found, updating the reference to the relocated object, and scanning the relocated at least one other object for references to other objects in other cars and updating the remembered sets of the other cars with respect to the relocated at least one other object.

24. The computer readable media of claim 17 comprising further readable media containing instructions for execution in a processor for the practice of the process of claim 15, wherein at least one other car with at least one other object is in the collection set, the process further including the steps of: maintaining for each train a list of partially scanned enormous objects wherein in each collection increment some unscanned portion of some of these partially scanned objects is scanned for references to objects in other cars, wherein if a reference to an object in another car is found, updating the remembered set of that other car, and scanning the remaining unscanned portion of the enormous objects in each pertrain list for references into the collection set, if the collection set is not empty.

\* \* \* \* \*